US012703180B2

(12) United States Patent
Watanabe

(10) Patent No.: US 12,703,180 B2
(45) Date of Patent: Aug. 11, 2026

(54) LIQUID EJECTION APPARATUS AND LIQUID EJECTION METHOD

(71) Applicant: SEIKO EPSON CORPORATION, Tokyo (JP)

(72) Inventor: Yuki Watanabe, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 136 days.

(21) Appl. No.: 18/904,135

(22) Filed: Oct. 2, 2024

(65) Prior Publication Data

US 2025/0108609 A1 Apr. 3, 2025

(30) Foreign Application Priority Data

Oct. 3, 2023 (JP) ................................ 2023-171912

(51) Int. Cl.
*B41J 2/045* (2006.01)

(52) U.S. Cl.
CPC ....... *B41J 2/04573* (2013.01); *B41J 2/04541* (2013.01); *B41J 2/04581* (2013.01); *B41J 2/04588* (2013.01); *B41J 2/04596* (2013.01)

(58) Field of Classification Search
CPC ......................... B41J 2/04596; B41J 2/04598; B41J 2/04573; B41J 2/04588
See application file for complete search history.

(56) References Cited

U.S. PATENT DOCUMENTS

2010/0245425 A1* 9/2010 Suzuki ..................... B41J 29/38 347/10
2011/0096111 A1* 4/2011 Matsuo .................. B41J 2/2107 347/10

FOREIGN PATENT DOCUMENTS

| | | | |
|---|---|---|---|
| JP | 2002-001951 A | | 1/2002 |
| JP | 2004-209843 A | | 7/2004 |
| JP | 2005231174 A | * | 9/2005 |

OTHER PUBLICATIONS

Horie, MachineTranslationofJP-2005231174-A, 2005 (Year: 2005).*

* cited by examiner

*Primary Examiner* — Scott A Richmond

(74) *Attorney, Agent, or Firm* — Harness, Dickey & Pierce, P.L.C.

(57) ABSTRACT

A liquid ejection apparatus includes an ejection section that is configured to generate a pressure fluctuation in liquid in a pressure chamber that is communicating with a nozzle by driving a pressure generation unit in accordance with a pulse selected from the ejection pulse and the non-ejection pulse. When the non-ejection pulse is selected in a preceding cycle of two consecutive cycles among the repetitive cycles, and the ejection pulse is selected in a following cycle of the two consecutive cycles, a pulse interval T1 between the non-ejection pulse of the preceding cycle and the ejection pulse of the following cycle satisfies any one of following expressions (1) and (2):

$$1.7 \times Tc \times n \leq T1 \leq 1.9 \times Tc \times n \quad (1)$$

$$1.2 \times Tc \times n \leq T1 \leq 1.4 \times Tc \times n. \quad (2)$$

16 Claims, 21 Drawing Sheets

LIQUID EJECTION APPARATUS AND LIQUID EJECTION METHOD

The present application is based on, and claims priority from JP Application Serial Number 2023-171912, filed Oct. 3, 2023, the disclosure of which is hereby incorporated by reference herein in its entirety.

BACKGROUND

1. Technical Field

The present disclosure relates to a liquid ejection apparatus and a liquid ejection method.

2. Related Art

A liquid ejection apparatus provided with a liquid ejection head for ejecting liquid such as ink onto a medium such as printing paper is proposed in the related art.

A liquid ejection head described in JP-A-2002-1951 includes a piezoelectric vibrator that causes ink in a nozzle to perform micro-vibration, a micro-vibration control signal generation unit that generates a micro-vibration control signal, and a control section that drives the piezoelectric vibrator based on the micro-vibration control signal. The micro-vibration control signal includes a drive pulse that causes a meniscus, which is a surface of the ink exposed at a nozzle opening, to perform micro-vibration for a nozzle that does not eject ink droplets. When the micro-vibration control signal is supplied to the piezoelectric vibrator, the meniscus of the nozzle performs micro-vibration, and the ink at a nozzle opening portion is stirred. By performing the micro-vibration operation, the thickening of the liquid in the nozzle is suppressed.

However, increasing the micro-vibration of the meniscus to stir the ink in the nozzle may lead to instability in the ejection of the ink droplets immediately after the micro-vibration.

SUMMARY

An aspect of the present disclosure is a liquid ejection apparatus including: an ejection section including a nozzle, a pressure chamber communicating with the nozzle, and a pressure generation unit that generates a pressure fluctuation in liquid in the pressure chamber; a drive signal generation section that repeatedly generates a drive signal including a plurality of pulses including an ejection pulse and a non-ejection pulse; and a drive control section that supplies a pulse selected from the ejection pulse and the non-ejection pulse included in the drive signal to the pressure generation unit for each of repetitive cycles, in which the ejection pulse is a pulse of which a potential changes to cause the pressure generation unit to generate the pressure fluctuation such that the liquid is ejected from the nozzle, the non-ejection pulse is a pulse of which a potential changes to cause the pressure generation unit to generate the pressure fluctuation such that the liquid is not ejected from the nozzle, and when the non-ejection pulse is selected in a preceding cycle of two consecutive cycles among the repetitive cycles, and the ejection pulse is selected in a following cycle, a pulse interval T1 between the non-ejection pulse of the preceding cycle and the ejection pulse of the following cycle satisfies any one of following expressions (1) and (2):

$$1.7\times Tc\times n\leq T1\leq 1.9\times Tc\times n \quad (1)$$

$$1.2\times Tc\times n\leq T1\leq 1.4\times Tc\times n \quad (2)$$

where Tc is a natural vibration cycle of the ejection section, and n is a natural number.

Another aspect of the present disclosure is a liquid ejection apparatus including: an ejection section including a nozzle, a pressure chamber communicating with the nozzle, and a pressure generation unit that generates a pressure fluctuation in liquid in the pressure chamber; a drive signal generation section that repeatedly generates a drive signal including a plurality of pulses including an ejection pulse and a non-ejection pulse; and a drive control section that supplies a pulse selected from the ejection pulse and the non-ejection pulse included in the drive signal to the pressure generation unit for each of repetitive cycles, in which the ejection pulse is a pulse of which a potential changes to cause the pressure generation unit to generate the pressure fluctuation such that the liquid is ejected from the nozzle, the non-ejection pulse is a pulse of which a potential changes to cause the pressure generation unit to generate the pressure fluctuation such that the liquid is not ejected from the nozzle, and when the non-ejection pulse is selected in a preceding cycle of two consecutive cycles among the repetitive cycles, and the ejection pulse is selected in a following cycle, a coupling interval T2 between the non-ejection pulse of the preceding cycle and the ejection pulse of the following cycle satisfies any one of following expressions (1) and (2):

$$1.7\times Tc\times n\leq T2\leq 1.9\times Tc\times n \quad (1)$$

$$1.2\times Tc\times n\leq T2\leq 1.4\times Tc\times n \quad (2)$$

where Tc is a natural vibration cycle of the ejection section, and n is a natural number.

Still another aspect of the present disclosure is a liquid ejection method executed by a liquid ejection apparatus configured to eject liquid, in which the liquid ejection apparatus includes an ejection section including a nozzle, a pressure chamber communicating with the nozzle, and a pressure generation unit that generates a pressure fluctuation in liquid in the pressure chamber, a drive signal generation section that repeatedly generates a drive signal including a plurality of pulses including an ejection pulse and a non-ejection pulse, and a drive control section that supplies a pulse selected from the ejection pulse and the non-ejection pulse included in the drive signal to the pressure generation unit for each of repetitive cycles, the ejection pulse is a pulse of which a potential changes to cause the pressure generation unit to generate the pressure fluctuation such that the liquid is ejected from the nozzle, the non-ejection pulse is a pulse of which a potential changes to cause the pressure generation unit to generate the pressure fluctuation such that the liquid is not ejected from the nozzle, and when the non-ejection pulse is selected in a preceding cycle of two consecutive cycles among the repetitive cycles, and the ejection pulse is selected in a following cycle, a pulse interval T1 between the non-ejection pulse of the preceding cycle and the ejection pulse of the following cycle satisfies any one of following expressions (1) and (2):

$$1.7\times Tc\times n\leq T1\leq 1.9\times Tc\times n \quad (1)$$

$$1.2\times Tc\times n\leq T1\leq 1.4\times Tc\times n \quad (2)$$

where Tc is a natural vibration cycle of the ejection section, and n is a natural number.

Still another aspect of the present disclosure is a liquid ejection method executed by a liquid ejection apparatus configured to eject liquid, in which the liquid ejection apparatus includes an ejection section including a nozzle, a pressure chamber communicating with the nozzle, and a pressure generation unit that generates a pressure fluctuation in liquid in the pressure chamber, a drive signal generation section that repeatedly generates a drive signal including a plurality of pulses including an ejection pulse and a non-ejection pulse, and a drive control section that supplies a pulse selected from the ejection pulse and the non-ejection pulse included in the drive signal to the pressure generation unit for each of repetitive cycles, the ejection pulse is a pulse of which a potential changes to cause the pressure generation unit to generate the pressure fluctuation such that the liquid is ejected from the nozzle, the non-ejection pulse is a pulse of which a potential changes to cause the pressure generation unit to generate the pressure fluctuation such that the liquid is not ejected from the nozzle, and when the non-ejection pulse is selected in a preceding cycle of two consecutive cycles among the repetitive cycles, and the ejection pulse is selected in a following cycle, a coupling interval T2 between the non-ejection pulse of the preceding cycle and the ejection pulse of the following cycle satisfies any one of following expressions (1) and (2):

$$1.7\times Tc\times n\leq T2\leq 1.9\times Tc\times n \quad (1)$$

$$1.2\times Tc\times n\leq T2\leq 1.4\times Tc\times n \quad (2)$$

where Tc is a natural vibration cycle of the ejection section, and n is a natural number.

DESCRIPTION OF EMBODIMENTS

Figure 1:
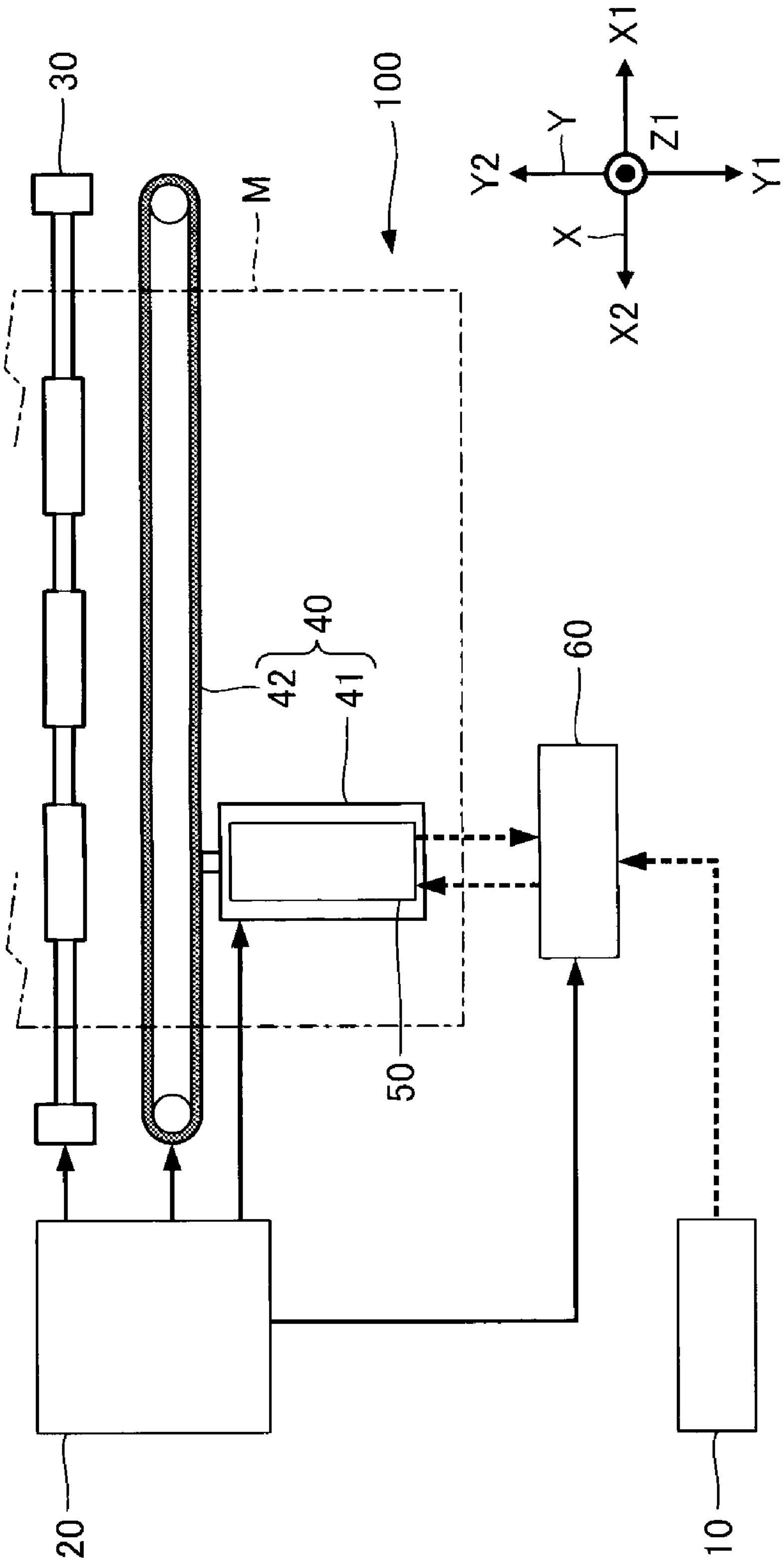
FIG. 1 is a schematic diagram illustrating a configuration example of a liquid ejection apparatus according to a first embodiment.

Hereinafter, preferred embodiments according to the present disclosure will be described with reference to the accompanying drawings. In the drawings, the dimensions and scales of each section are appropriately different from the actual dimensions and scales, and some sections are schematically illustrated for easy understanding. Further, the scope of the present disclosure is not limited to the embodiments unless otherwise specified in the following description to the effect that the present disclosure is limited to the embodiments.

The following description will be made with an X axis, a Y axis, and a Z axis that intersect each other as appropriate. Hereinafter, one direction along the X axis is an X1 direction, and a direction opposite to the X1 direction is an X2 direction. Similarly, the directions opposite to each other along the Y axis are a Y1 direction and a Y2 direction. The opposite directions along the Z axis are a Z1 direction and a Z2 direction. Typically, the Z axis is a vertical axis, and the Z2 direction corresponds to a down direction in a vertical direction. However, the Z axis need not be the vertical axis. The X axis, the Y axis, and the Z axis are typically orthogonal to each other, but are not limited to this, and need only intersect each other, for example, at an angle within a range of, for example, 80° or more and 1000 or less.

1: FIRST EMBODIMENT

1A: Overall Configuration of Liquid Ejection Apparatus 100

FIG. 1 is a schematic diagram illustrating a configuration example of a liquid ejection apparatus 100 according to a first embodiment. The liquid ejection apparatus 100 is an ink jet type printing apparatus that ejects liquid such as ink onto a medium M in a form of liquid droplets. The medium M is, for example, printing paper. The medium M is not limited to the printing paper and may be, for example, any material that is a printing target such as a resin film or fabric.

The liquid ejection apparatus 100, as illustrated in FIG. 1, includes a liquid container 10, a control unit 20, a transport mechanism 30, a moving mechanism 40, a liquid ejection head 50, and a circulation mechanism 60.

The liquid container 10 stores the ink. Specific aspects of the liquid container 10 include, for example, a cartridge that can be attached to and detached from the liquid ejection apparatus 100, a bag-shaped ink pack formed of a flexible film, and an ink tank that can be refilled with an ink. A type of the ink stored in the liquid container 10 is optional.

The control unit 20 controls an operation of each element of the liquid ejection apparatus 100. The control unit 20 includes, for example, one or a plurality of processing circuits such as a central processing unit (CPU) or a field-programmable gate array (FPGA), and one or a plurality of storage circuits such as a semiconductor memory.

The transport mechanism 30 transports the medium M in the Y1 direction under the control of the control unit 20. The moving mechanism 40 reciprocates the liquid ejection head 50 along the X axis under the control of the control unit 20. The moving mechanism 40 includes a substantially box-shaped carriage 41 that houses the liquid ejection head 50, and an endless transport belt 42 to which the carriage 41 is fixed. The number of liquid ejection heads 50 mounted in the carriage 41 is not limited to one, and may be plural. Further, the liquid container 10 may be mounted in the carriage 41 in addition to the liquid ejection head 50.

The liquid ejection head 50 ejects the ink supplied from the liquid container 10 onto the medium M from each of a plurality of nozzles under the control of the control unit 20. The ejection is performed in parallel with the transport of the medium M via the transport mechanism 30 and the reciprocating movement of the liquid ejection head 50 via the moving mechanism 40, and thus an image is formed by the ink on a surface of the medium M.

The liquid container 10 is coupled to the liquid ejection head 50 via the circulation mechanism 60. The circulation mechanism 60 is a mechanism that supplies the ink to the liquid ejection head 50 under the control of the control unit 20, and recovers the ink discharged from the liquid ejection head 50 for re-supply to the liquid ejection head 50.

1B: Electrical Configuration of Liquid Ejection Apparatus 100

Figure 2:
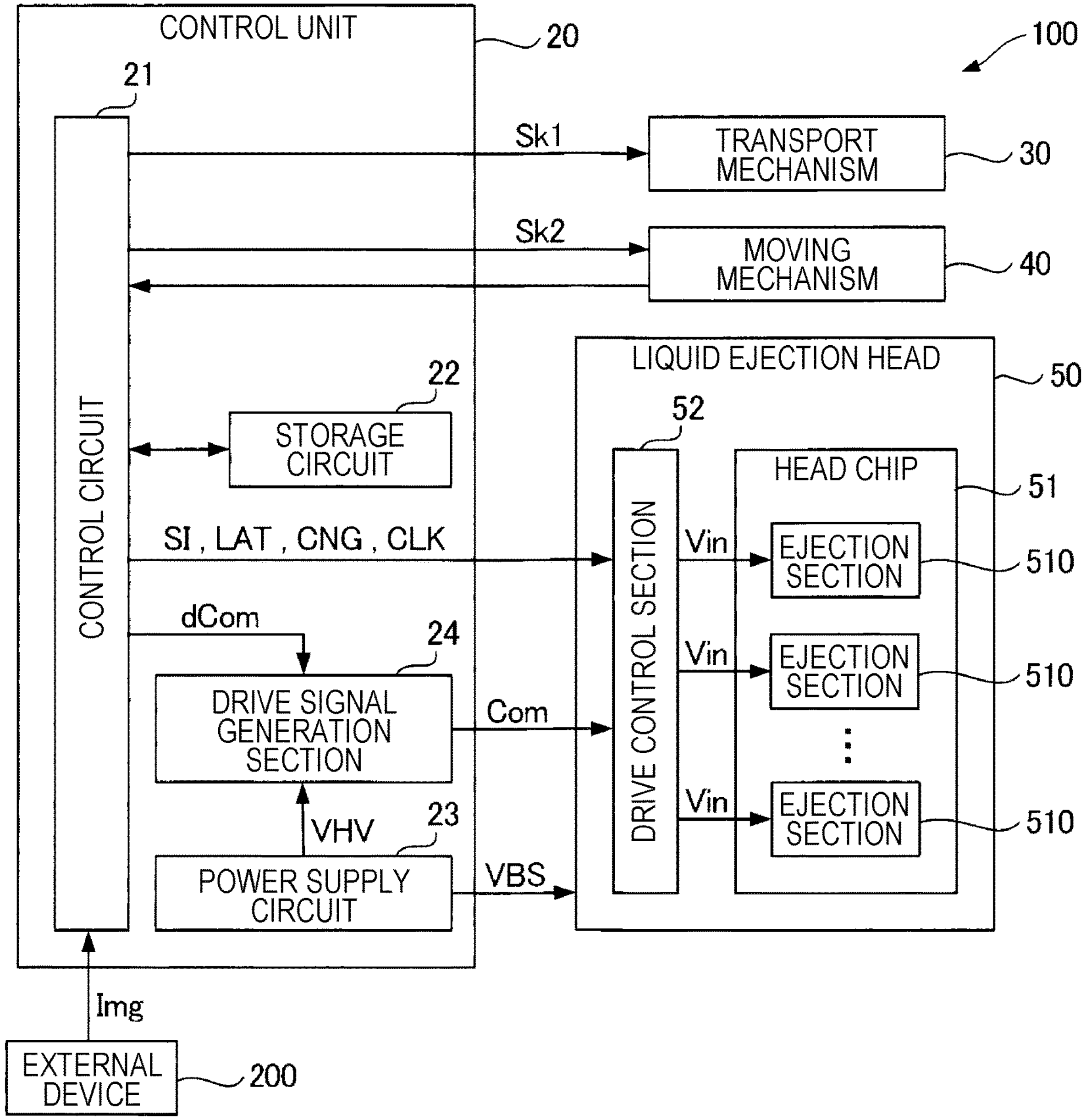
FIG. 2 is a diagram illustrating an electrical configuration of the liquid ejection apparatus according to the first embodiment.

FIG. 2 is a diagram illustrating an electrical configuration of the liquid ejection apparatus 100 according to the first embodiment. As illustrated in FIG. 2, the liquid ejection head 50 includes a head chip 51 and a drive control section 52.

The head chip 51 includes a plurality of ejection sections 510. The drive control section 52 switches whether supply a drive signal Com output from the control unit 20 as a supply signal Vin to each of the plurality of ejection sections 510 of the head chip 51 under the control of the control unit 20. In the example illustrated in FIG. 2, the head chip 51 includes M ejection sections 510. M is a natural number of 1 or more. Hereinafter, among the M ejection sections 510, an m-th ejection section 510 may be referred to as an ejection section 510*m*. m is a natural number of "1≤m≤M". Further, hereinafter, when a component or a signal of the liquid ejection head 50 corresponds to the ejection section 510*m* among the M ejection sections 510, the subscript m may be added to the reference numeral representing the component or the signal.

As illustrated in FIG. 2, the control unit 20 includes a control circuit 21, a storage circuit 22, a power supply circuit 23, and a drive signal generation section 24.

The control circuit 21 has a function of controlling an operation of each section of the liquid ejection apparatus 100 and a function of processing various data. The control circuit 21 includes, for example, one or more processors such as a central processing unit (CPU). The control circuit 21 may include a programmable logic device such as a field-programmable gate array (FPGA) instead of the CPU or in addition to the CPU. In addition, when the control circuit 21 includes a plurality of processors, the plurality of processors may be mounted on different substrates or the like.

The storage circuit 22 stores various programs executed by the control circuit 21 and various data such as printing data Img processed by the control circuit 21. The storage circuit 22 includes, for example, a semiconductor memory of one or both of a volatile memory such as a random access memory (PAM) and a non-volatile memory such as a read only memory (ROM), an electrically erasable programmable read-only memory (EEPROM) or a programmable ROM (PROM). The printing data Img is supplied from an external device 200 such as a personal computer or a digital camera. The storage circuit 22 may be configured as a part of the control circuit 21.

The power supply circuit 23 receives the power supplied from a commercial power supply (not illustrated) and generates various predetermined potentials. The generated various potentials are appropriately supplied to each section of the liquid ejection apparatus 100. The power supply circuit 23 generates, for example, a power supply potential VHV and an offset potential VBS. The offset potential VBS is supplied to the liquid ejection head 50. Further, the power supply potential VHV is supplied to the drive signal generation section 24.

The drive signal generation section 24 is a circuit that repeatedly generates the drive signal Com for driving each pressure generation unit 51*e*. Specifically, the drive signal generation section 24 includes, for example, a DA conversion circuit and an amplification circuit. In the drive signal generation section 24, the DA conversion circuit converts a waveform designation signal dCom from the control circuit 21 from a digital signal to an analog signal. The drive signal Com is generated by amplifying the analog signal using the power supply potential VHV from the power supply circuit 23 via the amplification circuit. Among the waveforms included in the drive signal Com, a signal of the waveform actually supplied to the pressure generation unit 51*e* is the supply signal Vin. The waveform designation signal dCom is a digital signal for defining the waveform of the drive signal Com.

The control circuit 21 executes a program stored in the storage circuit 22 to control the operation of each section of the liquid ejection apparatus 100. Here, by executing the program, the control circuit 21 generates control signals Sk1 and Sk2, a printing data signal SI, the waveform designation signal dCom, a latch signal LAT, a change signal CNG, and a clock signal CLK as signals for controlling the operation of each section of the liquid ejection apparatus 100.

The control signal Sk1 is a signal for controlling the driving of the transport mechanism 30. The control signal Sk2 is a signal for controlling the driving of the moving mechanism 40. The printing data signal SI is a digital signal used to designate an operation state of the pressure generation unit 51*e*. The latch signal LAT and the change signal CNG are timing signals that are used together with the printing data signal SI and define an ink ejection timing from each nozzle of the head chip 51. These timing signals are generated, for example, based on output of an encoder that detects a position of the carriage 41.

1C: Flow Channel of Liquid Ejection Head 50

Figure 3:
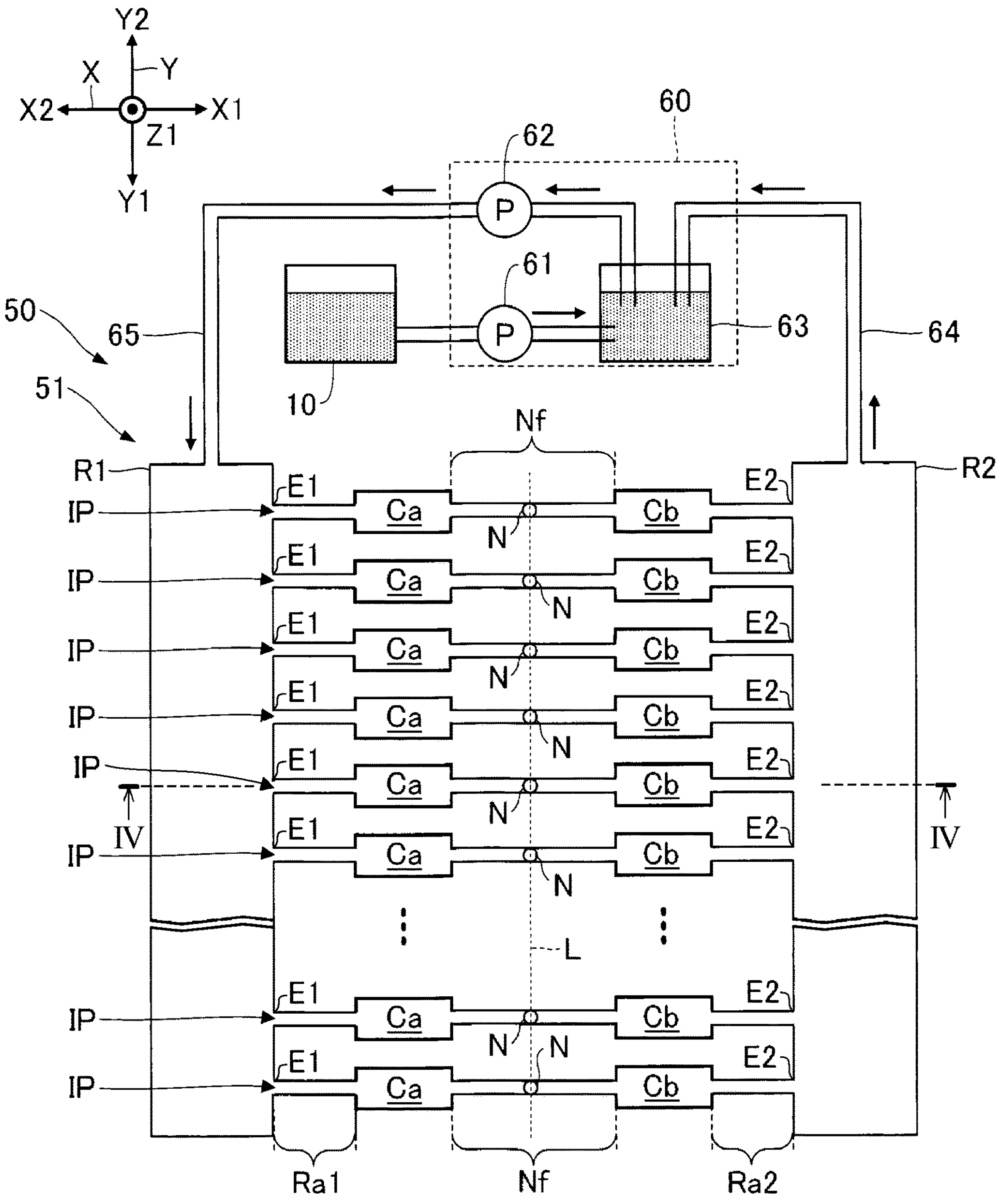
FIG. 3 is a schematic diagram illustrating a circulation flow channel of a liquid ejection head.

FIG. 3 is a schematic diagram illustrating a circulation flow channel of the liquid ejection head 50. As illustrated in FIG. 3, the liquid ejection head 50 is provided with a plurality of nozzles N, a plurality of individual flow channels IP, a first common liquid chamber R1, and a second common liquid chamber R2. The first common liquid chamber R1 and the second common liquid chamber R2 are coupled to the circulation mechanism 60. A circulation flow channel is formed by the individual flow channels IP, the first common liquid chamber R1, and the second common liquid chamber R2.

The plurality of nozzles N are arranged along the Y axis. Each of the plurality of nozzles N ejects the ink in the Z2 direction. A set of the plurality of nozzles N forms a nozzle array L. Further, the plurality of nozzles N are arranged at equal intervals.

Each of the plurality of nozzles N communicates with the individual flow channel IP. The plurality of respective individual flow channels IP extend along the X axis and communicate with different nozzles N. Further, the plurality of individual flow channels IP are arranged along the Y axis.

Each individual flow channel IP includes a pressure chamber Ca, a pressure chamber Cb, a communication flow channel Nf, an individual supply flow channel Ra1, and an individual discharge flow channel Ra2.

Each of the pressure chamber Ca and the pressure chamber Cb in the individual flow channels IP is a space which extends along the X axis and in which the ink ejected from the nozzle N communicating with the individual flow channels IP is stored. In the example illustrated in FIG. 3, a plurality of pressure chambers Ca are arranged along the Y axis. Similarly, a plurality of pressure chambers Cb are arranged along the Y axis. In each individual flow channel IP, the positions of the pressure chamber Ca and the pressure chamber Cb in a direction along the Y axis are the same in the example illustrated in FIG. 3, but may be different from each other. Hereinafter, the pressure chamber Ca and the pressure chamber Cb are collectively referred to as a "pressure chamber C" when no distinction is necessary.

Between the pressure chamber Ca and the pressure chamber Cb in each individual flow channel IP, the communication flow channel Nf is disposed. In each individual flow channel IP, the communication flow channel Nf is a flow channel through which the pressure chamber Ca and the pressure chamber Cb communicate with each other. Further, a plurality of communication flow channels Nf are arranged along the Y axis at intervals from each other. The nozzle N is provided in each communication flow channel Nf. In each communication flow channel Nf, the ink is ejected from the nozzle N due to the pressure fluctuations in the pressure chamber Ca and the pressure chamber Cb.

Each individual flow channel IP is provided with the individual supply flow channel Ra1 between the pressure chamber Ca and the first common liquid chamber R1. The individual supply flow channel Ra1 is a flow channel through which the pressure chamber Ca and the first common liquid chamber R1 communicate with each other. Similarly, each individual flow channel IP is provided with the individual discharge flow channel Ra2 between the pressure chamber Cb and the second common liquid chamber R2. The individual discharge flow channel Ra2 is a flow channel through which the pressure chamber Cb and the second common liquid chamber R2 communicate with each other.

The first common liquid chamber R1 and the second common liquid chamber R2 communicate with each other commonly through each of the plurality of individual flow channels IP. Each of the first common liquid chamber R1 and the second common liquid chamber R2 is a space extending along the Y axis over the entire range in which the plurality of nozzles N are distributed. When seen in a direction along the Z axis, the plurality of individual flow channels IP are located between the first common liquid chamber R1 and the second common liquid chamber R2.

The first common liquid chamber R1 is coupled to an end portion E1 of each individual flow channel IP in the X2 direction. In the first common liquid chamber R1, the ink is stored for supply to each individual flow channel IP. On the other hand, the second common liquid chamber R2 is coupled to an end portion E2 of each individual flow channel IP in the X1 direction. The second common liquid chamber R2 stores the ink discharged from each individual flow channel IP without being used for ejection.

The first common liquid chamber R1 and the second common liquid chamber R2 are coupled to the circulation mechanism 60. The circulation mechanism 60 supplies the ink to the first common liquid chamber R1 and recovers the ink discharged from the second common liquid chamber R2 for re-supply to the first common liquid chamber R1. The circulation mechanism 60 includes a first supply pump 61, a second supply pump 62, a storage container 63, a recovery flow channel 64, and a supply flow channel 65.

The first supply pump 61 is a pump that supplies the ink stored in the liquid container 10 to the storage container 63. The storage container 63 is a sub-tank that temporarily stores the ink supplied from the liquid container 10. The recovery flow channel 64 is a flow channel through which the second common liquid chamber R2 and the storage container 63 communicate with each other, and which recovers the ink from the second common liquid chamber R2 to the storage container 63. The storage container 63 is supplied with the ink stored in the liquid container 10 from the first supply pump 61 and is supplied with the ink, which is discharged from each individual flow channel IP to the second common liquid chamber R2, through the recovery flow channel 64. The second supply pump 62 is a pump that sends the ink stored in the storage container 63. The supply flow channel 65 is a flow channel through which the first common liquid chamber R1 and the storage container 63 communicate with each other, and which supplies the ink from the storage container 63 to the first common liquid chamber R1.

1D: Specific Structure of Head Chip 51

Figure 4:
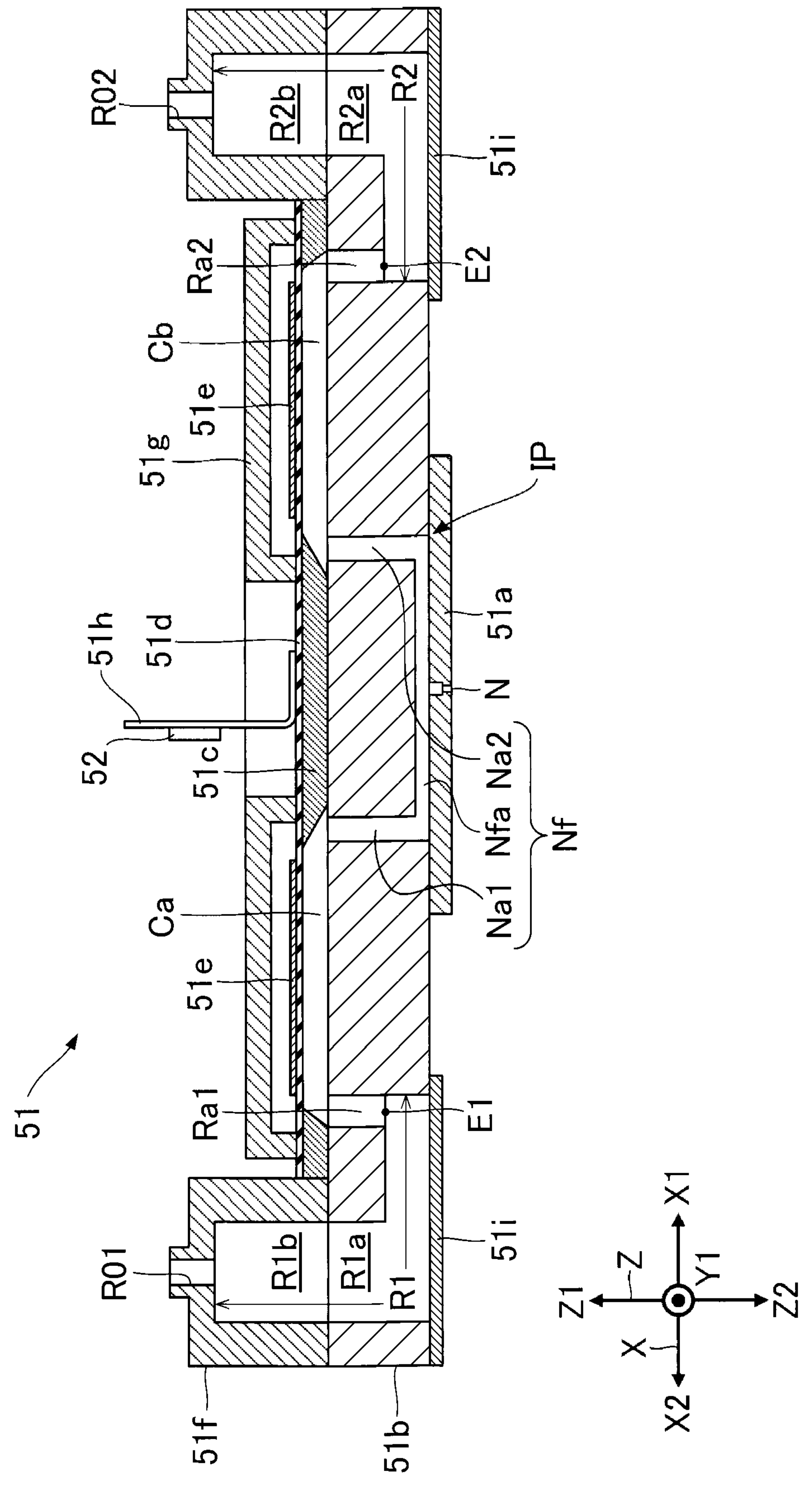
FIG. 4 is a cross-sectional view taken along line IV-IV in FIG. 3.

FIG. 4 is a cross-sectional view taken along line IV-IV in FIG. 3. In FIG. 4, a cross section of the head chip 51, which is cut along a plane orthogonal to the Y axis along the individual flow channel IP, is illustrated. As illustrated in FIG. 4, the head chip 51 includes a nozzle substrate 51*a*, a flow channel substrate 51*b*, a pressure chamber substrate 51*c*, a vibration plate 51*d*, a plurality of pressure generation units 51*e*, a case 51*f*, a protective plate 51*g*, and a wiring substrate 51*h*.

The nozzle substrate 51*a*, the flow channel substrate 51*b*, the pressure chamber substrate 51*c*, and the vibration plate 51*d* are laminated in this order in the Z1 direction. Each of these members extends along the Y axis and is manufactured, for example, by processing a single-crystal silicon substrate using semiconductor processing technology. The members are bonded to each other with an adhesive or the like. Another layer such as an adhesive layer or a substrate may be appropriately interposed between two adjacent members among the members.

The nozzle substrate 51*a* is provided with the plurality of nozzles N. Each of the plurality of nozzles N is a through-hole extends along the Z axis to penetrate through the nozzle substrate 51*a* and through which the ink passes.

The flow channel substrate 51*b* is provided with, a portion excluding the pressure chamber Ca and the pressure chamber Cb in the plurality of individual flow channels IP, a liquid chamber R1*a*, which is a part of the first common liquid chamber R1, and a liquid chamber R2*a*, which is a part of the second common liquid chamber R2. That is, the flow channel substrate 51*b* is provided with the communication flow channel Nf, the individual supply flow channel Ra1, the individual discharge flow channel Ra2, the liquid chamber R1*a*, and the liquid chamber R2*a*.

Each of the liquid chamber R1*a* and the liquid chamber R2*a* is a space that penetrates through the flow channel substrate 51*b*. On the surface of the flow channel substrate 51*b* facing the Z2 direction, a vibration absorber 51*i* is installed to close an opening formed by the space.

The vibration absorber 51*i* is a layered member formed of an elastic material. The vibration absorber 51*i* constitutes a part of a wall surface of each of the first common liquid chamber R1 and the second common liquid chamber R2, and absorbs the pressure fluctuations in the first common liquid chamber R1 and the second common liquid chamber R2.

The communication flow channel Nf includes a first communication flow channel Na1, a second communication flow channel Na2, and a nozzle flow channel Nfa. Each of the first communication flow channel Na1 and the second communication flow channel Na2 is a space that penetrates through the flow channel substrate 51*b*. The first communication flow channel Na1 and the second communication flow channel Na2 communicate with each other through the nozzle flow channel Nfa. The pressure chamber Ca and the nozzle flow channel Nfa communicate with each other through first communication flow channel Na1. The pressure chamber Cb and the nozzle flow channel Nfa communicate with each other through second communication flow channel Na2. The nozzle flow channel Nfa is a space in a groove provided in the surface of the flow channel substrate 51*b* facing the Z2 direction, and extends along the X axis. The nozzle substrate 51*a* constitutes a part of a wall surface of the nozzle flow channel Nfa.

Each of the individual supply flow channel Ra1 and the individual discharge flow channel Ra2 is a space that penetrates through the flow channel substrate 51*b*. Through the individual supply flow channel Ra1, the first common liquid chamber R1 and the pressure chamber Ca communicate with each other, and the ink is supplied from the first common liquid chamber R1 to the pressure chamber Ca. One end of the individual supply flow channel Ra1 is open to the surface of the flow channel substrate 51*b* facing the Z1 direction. On the other hand, the other end of the individual supply flow channel Ra1 is an end upstream of the individual flow channel IP and is open to the wall surface of the first common liquid chamber R1 in the flow channel substrate 51*b*. On the other hand, through the individual discharge flow channel Ra2, the second common liquid chamber R2 and the pressure chamber Cb communicate with each other, and the ink is discharged from the pressure chamber Cb to the second common liquid chamber R2. One end of the individual discharge flow channel Ra2 is open to the surface of the flow channel substrate 51*b* facing the Z1 direction. On the other hand, the other end of the individual discharge flow channel Ra2 is an end downstream of the individual flow channel IP and is open to the wall surface of the second common liquid chamber R2 in the flow channel substrate 51*b*.

The pressure chamber substrate 51*c* is provided with the pressure chamber Ca and the pressure chamber Cb of the plurality of individual flow channels IP. Each of the pressure chamber Ca and the pressure chamber Cb penetrates through the pressure chamber substrate 51*c* and is a gap between the flow channel substrate 51*b* and the vibration plate 51*d*. The pressure chamber Ca communicates with the nozzle N through the first communication flow channel Na1 and the nozzle flow channel Nfa. The pressure chamber Cb communicates with the nozzle N through the second communication flow channel Na2 and the nozzle flow channel Nfa.

The vibration plate 51*d* is a plate-like member that can elastically vibrate. The vibration plate 51*d* is a laminated that includes, for example, a first layer formed of silicon oxide ($SiO2$) and a second layer formed of zirconium oxide ($ZrO2$). Another layer, such as a metal oxide layer, may be interposed between the first layer and the second layer. Further, a part or all of the vibration plate 51*d* may be integrally formed of the same material as the pressure chamber substrate 51*c*. For example, the vibration plate 51*d* and the pressure chamber substrate 51*c* can be integrally formed by selectively removing a part in a thickness direction of a region corresponding to the pressure chamber C in a plate-like member having a predetermined thickness. Further, the vibration plate 51*d* may be formed of a single layer of material.

On the surface of the vibration plate 51*d* facing the Z1 direction, the plurality of pressure generation units 51*e* corresponding to different pressure chambers C are installed. The pressure generation unit 51*e* is a piezoelectric element that generates the pressure fluctuation in the liquid in the pressure chamber C. Each pressure generation unit 51*e* is formed, for example, of a laminate of a first electrode and a second electrode facing each other, and a piezoelectric layer disposed between the two electrodes. Each pressure generation unit 51*e* ejects the ink in the pressure chamber C from the nozzle N by fluctuating the pressure of the ink in the pressure chamber C. The pressure generation unit 51*e* causes the vibration plate 51*d* to vibrate in response to the deformation of the pressure generation unit 51*e* when supplied with the drive signal Com. The pressure chamber C is expanded and contracted in response to the vibration, so that the pressure of the ink in the pressure chamber C fluctuates.

The case 51*f* is a case for storing the ink. The case 51*f* is provided with a liquid chamber Rib, which is a portion excluding the liquid chamber R1*a* in the first common liquid chamber R1, a liquid chamber R2*b*, which is a portion excluding the liquid chamber R2*a* in the second common liquid chamber R2, an inlet R01, and an outlet R02. Each of the liquid chamber Rib and the liquid chamber R2*b* is a recess portion provided in the surface of the case 51*f* facing the Z2 direction. The inlet R01 is a through-hole formed by an inner peripheral surface extending from the surface of the case 51*f* facing the Z1 direction to the wall surface of the liquid chamber Rib. The supply flow channel 65 of the circulation mechanism 60 is coupled to the inlet R01. The outlet R02 is a through-hole formed by an inner peripheral surface extending from the surface facing the Z1 direction of the case 51*f* to the wall surface of the liquid chamber R2*b*. The recovery flow channel 64 of the circulation mechanism 60 is coupled to the outlet R02.

The protective plate 51*g* is a plate-like member installed on the surface of the vibration plate 51*d* facing the Z1 direction, and protects the plurality of pressure generation units 51*e* to reinforce the mechanical strength of the vibration plate 51*d*. Here, a space is formed between the protective plate 51*g* and the vibration plate 51*d* to house the plurality of pressure generation units 51*e*.

The wiring substrate 51*h* is a mounting component which is mounted on the surface of the vibration plate 51*d* facing the Z1 direction and which electrically couples the control unit 20 and the head chip 51. For example, a flexible wiring substrate 51*h* such as a flexible printed circuit (FPC) or a flexible flat cable (FFC) is suitably used. The drive control section 52 is mounted on the wiring substrate 51*h*.

In the head chip 51 having the above-described configuration, due to the operation of the circulation mechanism 60, the ink flows through the first common liquid chamber R1, the individual supply flow channel Ra1, the pressure chamber Ca, the communication flow channel Nf, the pressure chamber Cb, the individual discharge flow channel Ra2, and the second common liquid chamber R2 in this order. Further, by simultaneously driving the pressure generation units 51*e* corresponding to both the pressure chamber Ca and the pressure chamber Cb using the supply signal Vin from the drive control section 52, the pressures in the pressure chamber Ca and the pressure chamber Cb fluctuate, and the ink is ejected from the nozzle N in response to these pressure fluctuations.

In such a head chip 51, the ejection section 510 includes the nozzle N, the pressure chamber C, and the pressure generation unit 51*e*. In the present embodiment, the ejection section 510 is formed of the nozzle N, the pressure chamber Ca, the pressure chamber Cb, the individual supply flow channel Ra1, the individual discharge flow channel Ra2, the communication flow channel Nf, two pressure generation units 51*e*, and the vibration plate 51*d*.

1E: Nozzle N

Figure 5:
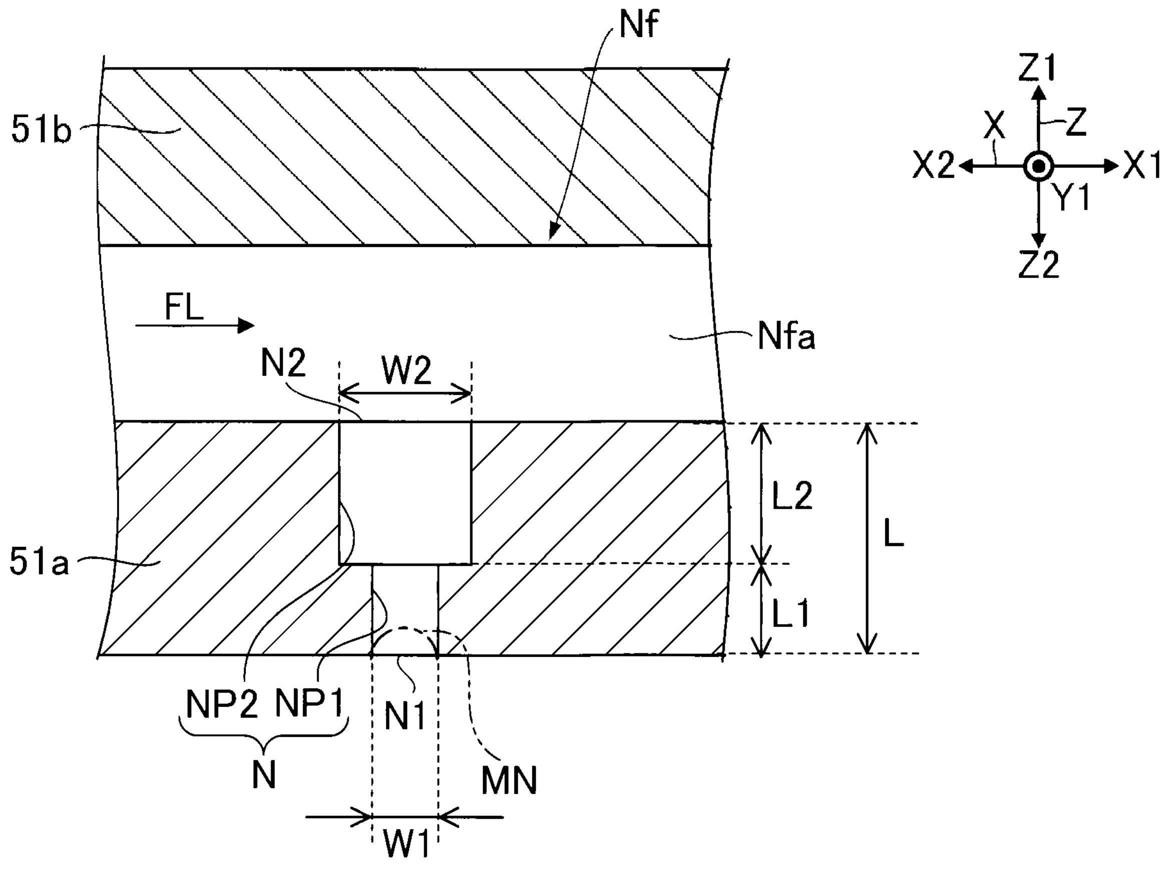
FIG. 5 is an enlarged cross-sectional view of a nozzle.

FIG. 5 is an enlarged cross-sectional view of the nozzle N. FIG. 5 illustrates a view of a part of the nozzle flow channel Nfa and the nozzle N in a cross section orthogonal to the Y axis. As illustrated in FIG. 5, the nozzle N branches off from the nozzle flow channel Nfa and extends in a different direction from the nozzle flow channel Nfa. Specifically, the nozzle flow channel Nfa extends in a direction along the X axis, whereas the nozzle N extends in the direction along the Z axis.

The nozzle N is a through-hole formed in the nozzle substrate 51*a*, and includes an ejection side opening end N1 and a coupling portion N2. The ejection side opening end N1 is an opening end on the surface of the nozzle N facing the Z2 direction of the nozzle substrate 51*a*. The coupling portion N2 is a boundary portion with the nozzle flow channel Nfa of the nozzle N. A length along the Z axis from the ejection side opening end N1 to the coupling portion N2 is a length L of the nozzle N.

In the example of FIG. 5, the nozzle N includes a first portion NP1 and a second portion NP2. The first portion NP1 and the second portion NP2 are arranged in this order along the Z1 direction. The second portion NP2 is provided between the nozzle flow channel Nfa and the first portion NP1. The nozzle flow channel Nfa and the first portion NP1 communicate with each other through the second portion NP2.

Each of the first portion NP1 and the second portion NP2 extends along the Z axis. A cross-sectional area of each of the first portion NP1 and the second portion NP2 is circular. The first portion NP1 and the second portion NP2 are provided coaxially. Further, the first portion NP1 includes the ejection side opening end N1. The second portion NP2 includes the coupling portion N2.

A length L1 of the first portion NP1 is shorter than a length L2 of the second portion NP2. The length L1 is a length along the Z axis from the ejection side opening end N1 to a boundary portion between the first portion NP1 and the second portion NP2. The length L2 is a length along the Z axis from the boundary portion between the first portion NP1 and the second portion NP2 to the coupling portion N2.

The cross-sectional area of the first portion NP1 is smaller than the cross-sectional area of the second portion NP2. Therefore, the nozzle N has a shape that is gradually narrowed in the Z2 direction. A width W1 of the first portion NP1 is smaller than a width W2 of the second portion NP2. By making the width W1 smaller than the width W2, it is possible to eject finer ink droplets, and it is possible to improve the landing accuracy of the ink droplets as compared to when the width is constant. Further, it is preferable that the width W2 is smaller than the width of the nozzle flow channel Nfa. By making the width W2 smaller than the width of the nozzle flow channel Nfa, it is possible to reduce crosstalk between two adjacent second portions NP2 in the direction along the Y axis direction.

The width W1 is a length in the direction orthogonal to the Z axis of the first portion NP1. The width W2 is a length in the direction orthogonal to the Z axis of the second portion NP2. Since the cross-sectional area of each of the first portion NP1 and the second portion NP2 is circular, the width W1 corresponds to a diameter of the first portion NP1, and the width W2 corresponds to a diameter of the second portion NP2. Further, the width of the nozzle flow channel Nfa is the length along the Z axis.

Further, a specific numerical value of the length L1 is not particularly limited, but is appropriately determined in accordance with the characteristics such as a required ink ejection amount or ejection velocity of the nozzle N. A specific numerical value of the length L2 is appropriately determined in accordance with the width W2 of the second portion NP2 or the thickness of the nozzle substrate Sla. Further, specific values of the width W1 and the width W2 are not particularly limited, but are appropriately determined, for example, in accordance with characteristics such as a required ink ejection amount or ejection velocity of the nozzle N.

The nozzle N extends in a direction that intersects the direction in which the nozzle flow channel Nfa extends, as described above. Therefore, even when the circulation mechanism 60 is operated, the ink circulation flow generated in the nozzle flow channel Nfa due to the operation of the circulation mechanism 60 is unlikely to reach the inside of the nozzle N. In particular, in the nozzle N including the first portion NP1 and the second portion NP2, it is necessary to ensure a certain length in the Z axis direction for each of the first portion NP1 and the second portion NP2. Therefore, as compared to the nozzle with a constant width, the nozzle N according to the present embodiment makes it more difficult for the circulation flow to reach the first portion NP1. Therefore, during a period in which the pressure generation unit 51*e* is not operated, the ink is likely to stagnate in the nozzle N. Therefore, when this period continues for a long period, the ink in the nozzle N may be thickened.

Therefore, in the liquid ejection apparatus 100, during a period in which the ink is not ejected from the nozzle N, the pressure generation unit 51*e* is driven to cause the meniscus MN to perform micro-vibration to the extent that the ink is not ejected from the nozzle N. This micro-vibration is vibration smaller than the vibration of the meniscus MN when ejecting the ink. Due to the micro-vibration, the ink in the nozzle N is stirred. Therefore, with the action of the ink circulation flow generated by the circulation mechanism 60, the ink replacement between the nozzle N and the nozzle flow channel Nfa is smoothly performed. Therefore, the ink in the nozzle N can be prevented from being thickened.

1F: Driving of Liquid Ejection Head 50

Figure 6:
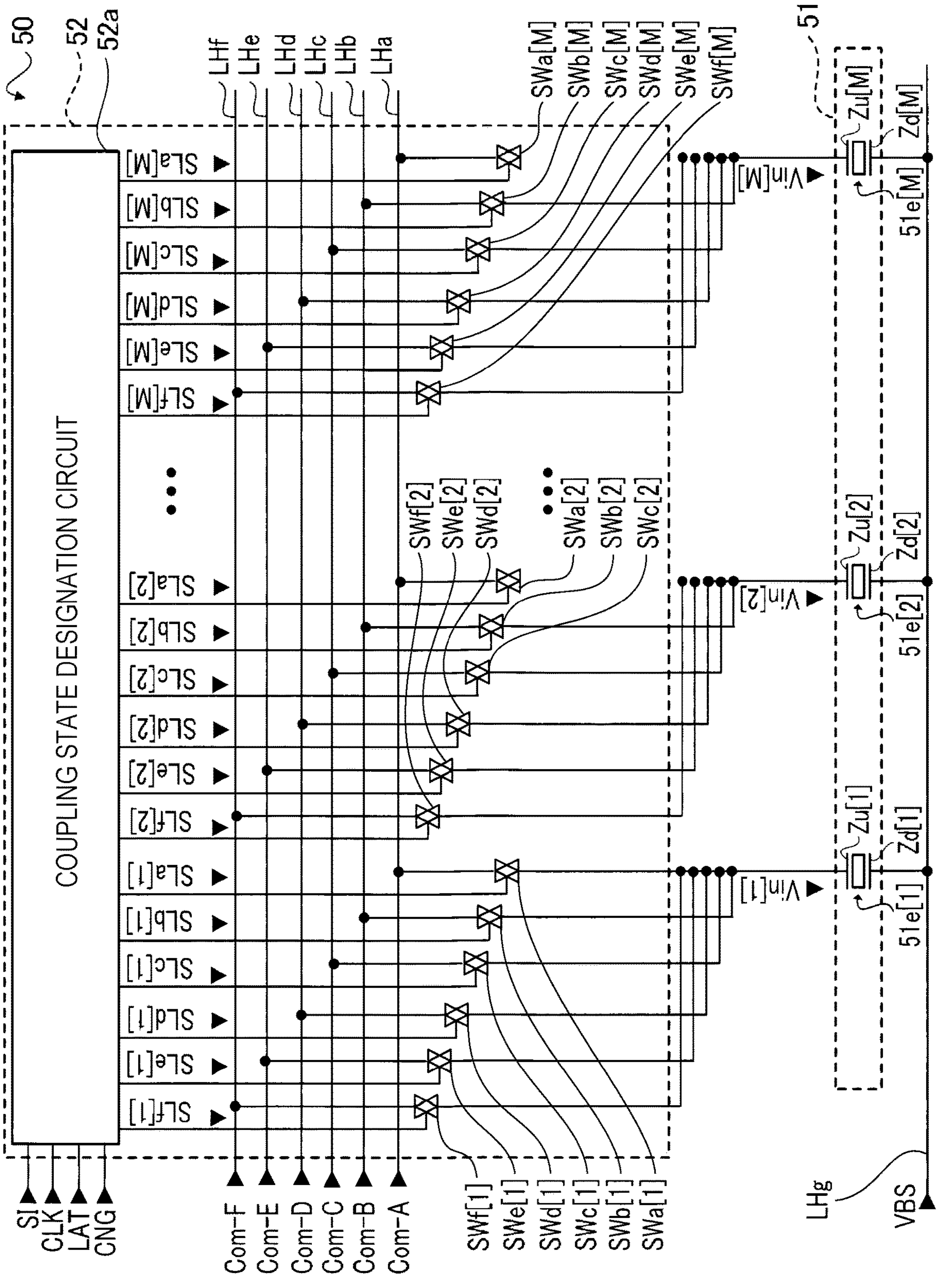
FIG. 6 is a diagram illustrating a drive control section.

FIG. 6 is a diagram illustrating the drive control section 52. As described above, the drive control section 52 supplies the drive signal Com, which is output from the drive signal generation section 24, to the pressure generation unit 51*e* as the supply signal Vin. The pressure generation unit 51*e* is driven by the supply signal Vin from the drive control section 52. In the example illustrated in FIG. 6, the drive signal Com includes a first drive signal Com-A, a second drive signal Com-B, a third drive signal Com-C, a fourth drive signal Com-D, a fifth drive signal Com-E, and a sixth drive signal Com-F.

The drive control section 52 is coupled to wirings LHa, LHb, LHc, LHd, LHe, and LHf. The wiring LHa is a signal line for transmitting the first drive signal Com-A. The wiring LHb is a signal line for transmitting the second drive signal Com-B. The wiring LHc is a signal line for transmitting the third drive signal Com-C. The wiring LHd is a signal line for transmitting the fourth drive signal Com-D. The wiring LHe is a signal line for transmitting the fifth drive signal Com-E. The wiring LHf is a signal line for transmitting the sixth drive signal Com-F. In FIG. 6, one of the first and second electrodes of the pressure generation unit 51*e* is illustrated as an electrode Zd[m], and the other is illustrated as an electrode Zu[m]. The wiring LHg is coupled to the electrode Zd[m]. The wiring LHg is a power supply line to which the offset potential VBS is supplied.

The drive control section 52 includes M switches SWa, M switches SWb, M switches SWc, M switches SWd, M switches SWe, M switches SWf, and a coupling state designation circuit 52*a* that designates coupling states of these switches.

The switch SWa[m] is a switch that switches between conduction (on) and non-conduction (off) between the wiring LHa for transmitting the first drive signal Com-A and the electrode Zu[m] of the pressure generation unit 51*e*[m]. The switch SWb[m] is a switch that switches between conduction (on) and non-conduction (off) between the wiring LHb for transmitting the second drive signal Com-B and the electrode Zu[m] of the pressure generation unit 51*e*[m]. The switch SWc[m] is a switch that switches between conduction (on) and non-conduction (off) between the wiring LHc for transmitting the third drive signal Com-C and the electrode Zu[m] of the pressure generation unit 51*e*[m]. The switch SWd[m] is a switch that switches between conduction (on) and non-conduction (off) between the wiring LHd for transmitting the fourth drive signal Com-D and the electrode Zu[m] of the pressure generation unit 51*e*[m]. The switch SWe[m] is a switch that switches between conduction (on) and non-conduction (off) between the wiring LHe for transmitting the fifth drive signal Com-E and the electrode Zu[m] of the pressure generation unit 51*e*[m]. The switch SWf[m] is a switch that switches between conduction (on) and non-conduction (off) between the wiring LHf for transmitting the sixth drive signal Com-F and the electrode Zu[m] of the pressure generation unit 51*e*[m]. Each of these switches is, for example, a transmission gate.

The coupling state designation circuit 52*a* generates coupling state designation signals SLa[m], SLb[m], SLc[m], SLd[m], SLe[m], and SLf[m] based on the clock signal CLK, the printing data signal SI, the latch signal LAT, and the change signal CNG supplied from the control circuit 21. Specifically, the coupling state designation circuit 52*a* generates coupling state designation signals SLa[1] to SLa[M] for designating on or off of switches SWa[1] to SWa[M]. The coupling state designation circuit 52*a* generates coupling state designation signals SLb[1] to SLb[M] for designating on or off of switches SWb[1] to SWb[M]. The coupling state designation circuit 52*a* generates coupling state designation signals SLc[1] to SLc[M] for designating on or off of switches SWc[1] to SWc[M]. The coupling state designation circuit 52*a* generates coupling state designation signals SLd[1] to SLd[M] for designating on or off of switches SWd[1] to SWd[M]. The coupling state designation circuit 52*a* generates coupling state designation signals SLe[1] to SLe[M] for designating on or off of switches SWe[1] to SWe[M]. The coupling state designation circuit 52*a* generates coupling state designation signals SLf[1] to SLf[M] for designating on or off of switches SWf[1] to SWf[M].

For example, although not illustrated, the coupling state designation circuit 52*a* includes a plurality of transfer circuits, a plurality of latch circuits, and a plurality of decoders which correspond one-to-one with the pressure generation unit 51*e*[1] to 51*e*[M]. Among these, the printing data signal SI is supplied to the transfer circuit. The printing data signal SI includes individual designation signal for each pressure generation unit 51*e*, and these individual designation signals are supplied serially. For example, in the printing data signal SI, the individual designation signals are transferred in order to the plurality of transfer circuits in synchronization with the clock signal CLK. The latch circuit latches the individual designation signal supplied to the transfer circuit based on the latch signal LAT. Further, the decoder generates the coupling state designation signals SLa[m], SLb[m], SLc[m], SLd[m], SLe[m], and SLf[m] based on the individual designation signal, the latch signal LAT, and the change signal CNG.

For example, the switch SWa[m] is in an on state when the coupling state designation signal SLa[m] is at a high level and is in an off state when the coupling state designation signal SLa[m] is at a low level. For example, the switch SWb[m] is in an on state when the coupling state designation signal SLb[m] is at a high level and is in an off state when the coupling state designation signal SLb[m] is at a low level. For example, the switch SWc[m] is in an on state when the coupling state designation signal SLc[m] is at a high level and is in an off state when the coupling state designation signal SLc[m] is at a low level. For example, the switch SWd[m] is in an on state when the coupling state designation signal SLd[m] is at a high level and is in an off state when the coupling state designation signal SLd[m] is at a low level. For example, the switch SWe[m] is in an on state when the coupling state designation signal SLe[m] is at a high level and is in an off state when the coupling state designation signal SLe[m] is at a low level. For example, the switch SWf[m] is in an on state when the coupling state designation signal SLf[m] is at a high level and is in an off state when the coupling state designation signal SLf[m] is at a low level.

1G: Drive Signal

Figure 7:
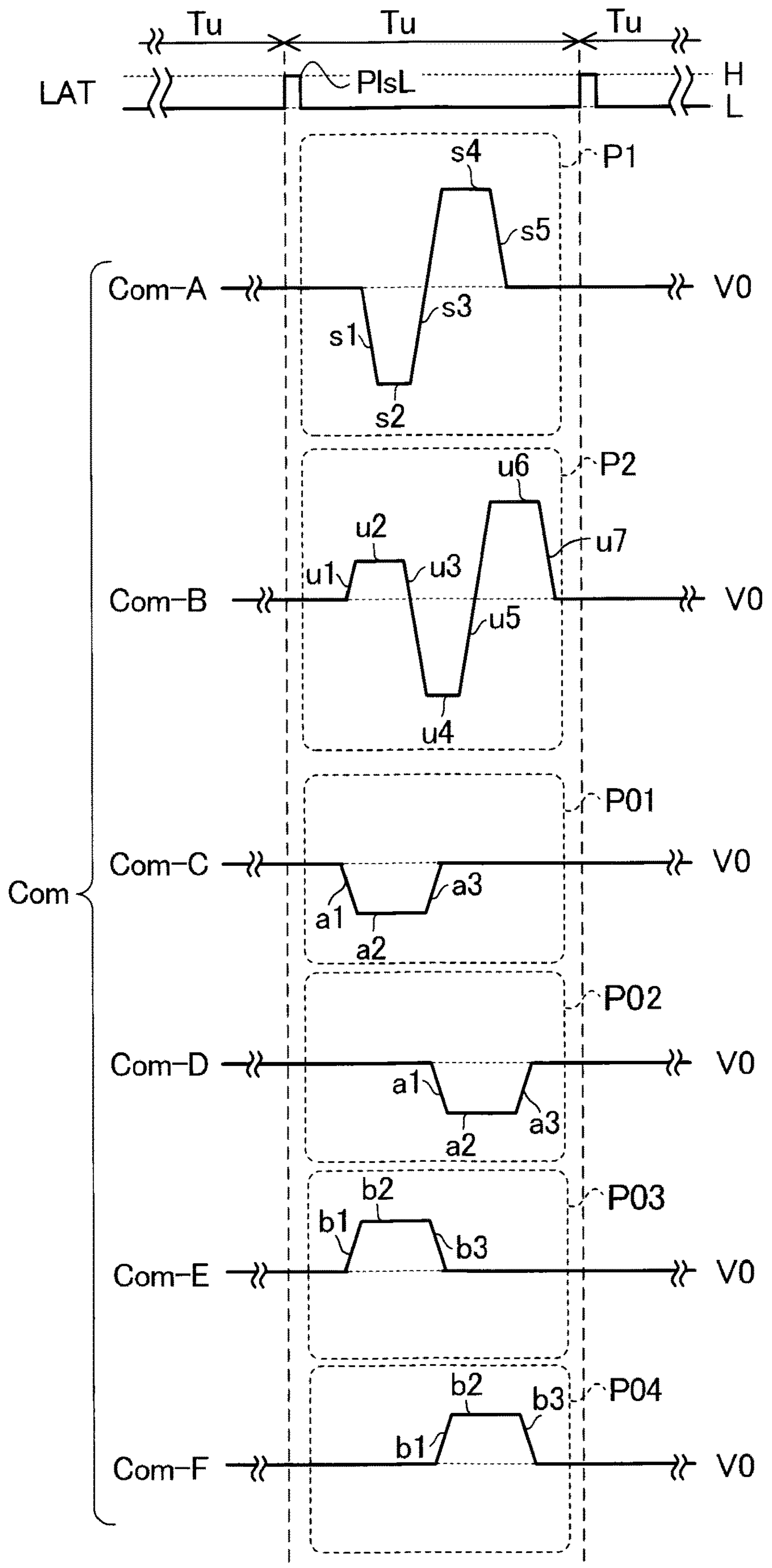
FIG. 7 is a diagram illustrating a drive signal.

FIG. 7 is a diagram illustrating the drive signal Com. As illustrated in FIG. 7, the latch signal LAT includes a pulse PlsL for defining repetitive cycles Tu. The cycle Tu corresponds to a printing cycle in which dots by the ink from the nozzle N are formed on the medium M. The cycle Tu is defined, for example, as a period from rising of the pulse PlsL to rising of the next pulse PlsL.

The first drive signal Com-A includes an ejection pulse P1. The ejection pulse P1 is a pulse of which a potential changes to cause the pressure generation unit 51*e* to generate the pressure fluctuation in the pressure chamber C such that the ink is ejected from the nozzle N. When the ejection pulse P1 is supplied to the pressure generation unit 51*e*, the ink is ejected from the nozzle N as ink droplets.

The ejection pulse P1 includes a second expansion drive element s1, a minimum potential s2, a contraction drive element s3, a maximum potential s4, and an expansion drive element s5 in this order. The minimum potential s2 is a minimum value of a voltage of the ejection pulse P1. The maximum potential s4 is a maximum value of the voltage of the ejection pulse P1. The second expansion drive element s1 is a falling edge from a reference potential toward the minimum potential s2. The second expansion drive element s1 is a drive element that drives the pressure generation unit 51*e* to expand a volume of the pressure chamber C. The contraction drive element s3 is a rising edge from the minimum potential s2 toward the maximum potential s4. The contraction drive element s3 is a drive element that drives the pressure generation unit 51*e* to contract the volume of the pressure chamber C. The expansion drive element s5 is a falling edge returning from the maximum potential s4 to the reference potential. The expansion drive element s5 is a drive element that drives the pressure generation unit 51*e* to expand the volume of the pressure chamber C. The reference potential is, for example, a potential higher than the offset potential VBS.

The second drive signal Com-B includes an ejection pulse P2. The ejection pulse P2 is a pulse of which a potential changes to cause the pressure generation unit 51*e* to generate the pressure fluctuation in the pressure chamber C such that the ink is ejected from the nozzle N. When the ejection pulse P2 is supplied to the pressure generation unit 51*e*, the ink is ejected from the nozzle N as ink droplets.

The ejection pulse P2 includes a preparatory contraction drive element u1, a high potential u2, an expansion drive element u3, a minimum potential u4, a contraction drive element u5, a maximum potential u6, and an expansion drive element u7 in this order. The minimum potential u4 is a minimum value of a voltage of the ejection pulse P2. The maximum potential u6 is a maximum value of the voltage of the ejection pulse P2. The high potential u2 is a potential that is higher than the reference potential and is lower than the maximum potential u6. The preparatory contraction drive element u1 is a rising edge from the reference potential toward the high potential u2. The preparatory contraction drive element u1 is a drive element that drives the pressure generation unit 51*e* to contract the volume of the pressure chamber C. The expansion drive element u3 is a falling edge from the high potential u2 toward the minimum potential u4. The expansion drive element u3 is a drive element that drives the pressure generation unit 51*e* to expand the volume of the pressure chamber C. The contraction drive element u5 is a rising edge from the minimum potential u4 toward the maximum potential u6. The contraction drive element u5 is a drive element that drives the pressure generation unit 51*e* to contract the volume of the pressure chamber C. The expansion drive element u7 is a falling edge returning from the maximum potential u6 to the reference potential. The expansion drive element u7 is a drive element that drives the pressure generation unit 51*e* to expand the volume of the pressure chamber C.

The third drive signal Com-C includes a non-ejection pulse P01. The non-ejection pulse P01 is a pulse of which a potential changes to cause the pressure generation unit 51*e* to generate the pressure fluctuation in the pressure chamber C such that the ink is not ejected from the nozzle N. By supplying the non-ejection pulse P01 to the pressure generation unit 51*e*, the meniscus MN of the ink in the nozzle N is caused to perform micro-vibration without the ink being ejected from the nozzle N.

The non-ejection pulse P01 includes a first expansion drive element a1, a minimum potential a2, and a first contraction drive element a3 in this order. The minimum potential s2 is a minimum value of a voltage of the non-ejection pulse P01. The first expansion drive element a1 is a falling edge from the reference potential toward the minimum potential a2. The first expansion drive element a1 is a drive element that drives the pressure generation unit 51*e* to expand the volume of the pressure chamber C. The first contraction drive element a3 is a rising edge from the minimum potential s2 toward the reference potential. The first contraction drive element a3 is a drive element that drives the pressure generation unit 51*e* to contract the volume of the pressure chamber C.

The fourth drive signal Com-D includes a non-ejection pulse P02. The non-ejection pulse P02 is a pulse of which a potential changes to cause the pressure generation unit 51*e* to generate the pressure fluctuation in the pressure chamber C such that the ink is not ejected from the nozzle N. By supplying the non-ejection pulse P02 to the pressure generation unit 51*e*, the meniscus MN of the ink in the nozzle N is caused to perform micro-vibration without the ink being ejected from the nozzle N.

Similar to the non-ejection pulse P01, the non-ejection pulse P02 includes the first expansion drive element a1, the minimum potential a2, and the first contraction drive element a3 in this order. The non-ejection pulse P02 and the non-ejection pulse P01 have different start timings for the first expansion drive element a1. The start timing of the non-ejection pulse P02 is later than the start timing of the non-ejection pulse P01.

The fifth drive signal Com-E includes a non-ejection pulse P03. The non-ejection pulse P03 is a pulse of which a potential changes to cause the pressure generation unit 51*e* to generate the pressure fluctuation in the pressure chamber C such that the ink is not ejected from the nozzle N. By supplying the non-ejection pulse P03 to the pressure generation unit 51*e*, the meniscus MN of the ink in the nozzle N is caused to perform micro-vibration without the ink being ejected from the nozzle N.

The non-ejection pulse P03 includes a first contraction drive element b1, a maximum potential b2, and a first expansion drive element b3 in this order. The maximum potential b2 is a maximum value of a voltage of the non-ejection pulse P02. The first contraction drive element b1 is a rising edge from the reference potential toward the maximum potential b2. The first contraction drive element b1 is a drive element that drives the pressure generation unit 51*e* to contract the volume of the pressure chamber C. The first expansion drive element b3 is a falling edge from the maximum potential b2 toward the reference potential. The first expansion drive element b3 is a drive element that drives the pressure generation unit 51*e* to expand the volume of the pressure chamber C.

The sixth drive signal Com-F includes a non-ejection pulse P04. The non-ejection pulse P04 is a pulse of which a potential changes to cause the pressure generation unit 51*e* to generate the pressure fluctuation in the pressure chamber C such that the ink is not ejected from the nozzle N. By supplying the non-ejection pulse P04 to the pressure generation unit 51*e*, the meniscus MN of the ink in the nozzle N is caused to perform micro-vibration without the ink being ejected from the nozzle N.

Similar to the non-ejection pulse P03, the non-ejection pulse P04 includes the first contraction drive element b1, the maximum potential b2, and the first expansion drive element b3 in this order. The non-ejection pulse P04 and the non-ejection pulse P03 have different start timings for the first expansion drive element a1. The start timing of the non-ejection pulse P04 is later than the start timing of the non-ejection pulse P03.

The drive signal generation section 24 repeatedly generates the drive signal Com including the plurality of pulses such as the ejection pulses P1 and P2 and the non-ejection pulses P01, P02, P03, and P04. The ejection pulses P1 and P2 and the non-ejection pulses P01, P02, P03, and P04 are appropriately selected and used as the supply signal Vin. When the ejection pulse P1 or P2 is selected, the ink is ejected from the nozzle N. When the non-ejection pulse P01, P02, P03, or P04 is selected, the ink in the nozzle N performs micro-vibration without the ink being ejected from the nozzle N.

1H: Time Interval Between Non-Ejection Pulse and Ejection Pulse

As described above, in order to suppress the thickening of the ink in the nozzle N, the meniscus MN of the ink in the nozzle N is caused to perform micro-vibration during the period in which the ink is not ejected. Due to the micro-vibration, the ink in the nozzle N is stirred. However, when the micro-vibration is increased to stir the ink in the nozzle N, the ink ejection immediately after the micro-vibration is unstable due to the residual vibration of the meniscus MN caused by the micro-vibration. As a result, there is a risk of the deterioration in the image quality.

In the present embodiment, in order to suppress the instability of the ink ejection immediately after the micro-vibration, a time interval between the non-ejection pulse P01, P02, P03, or P04 and the ejection pulse P1 or P2 are set to a specific pulse interval T1.

Figure 8:
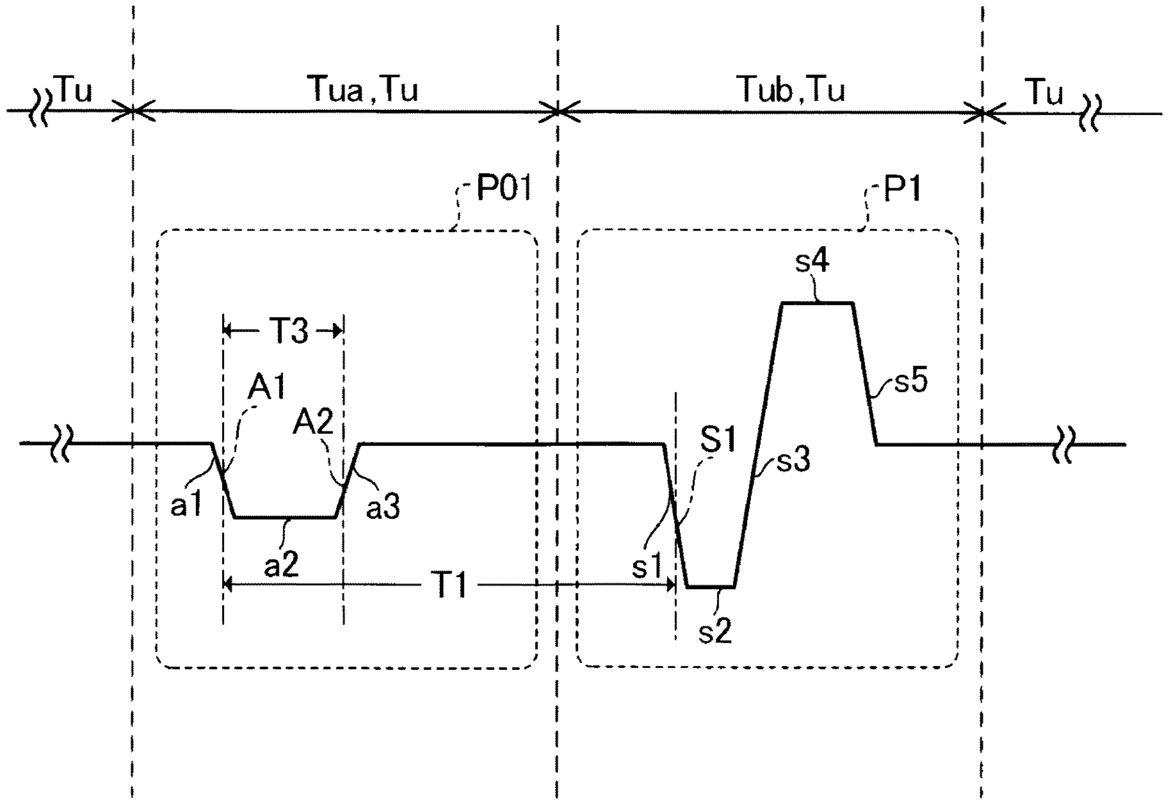
FIG. 8 is a diagram illustrating a pulse interval between a non-ejection pulse and an ejection pulse.
Figure 9:
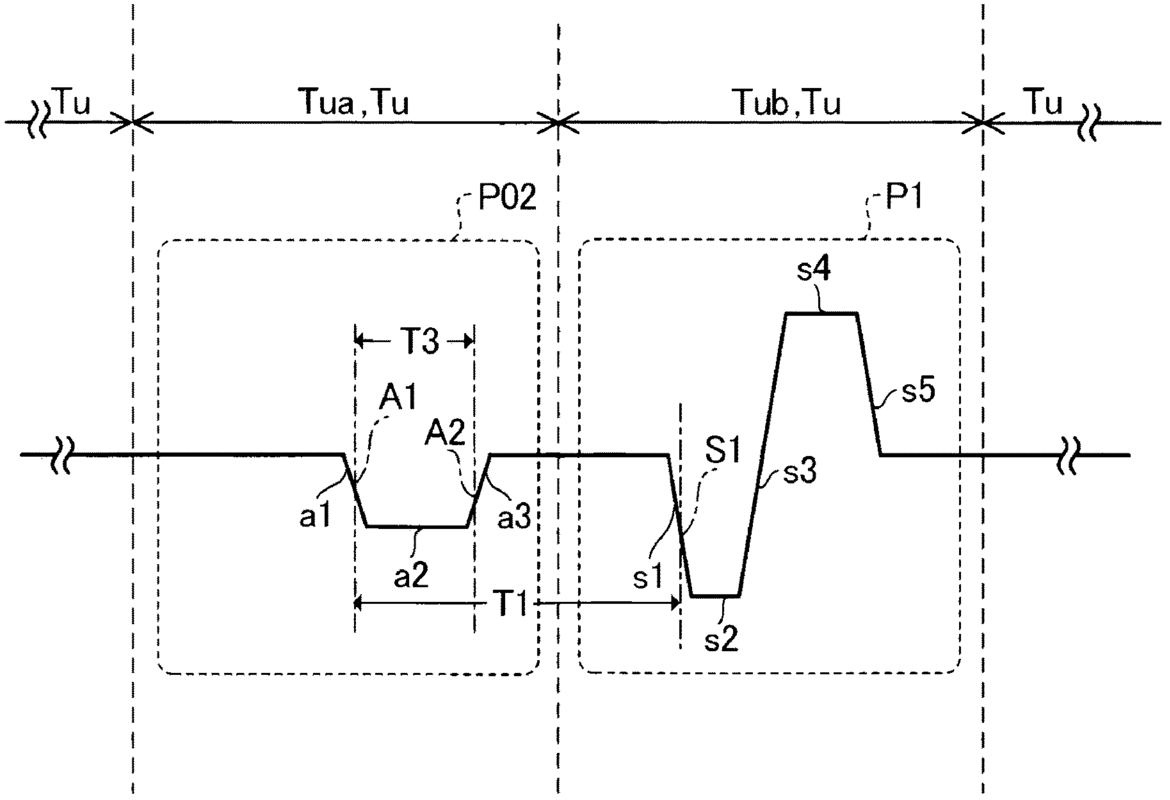
FIG. 9 is a diagram illustrating the pulse interval between the non-ejection pulse and the ejection pulse.

FIG. 8 is a diagram illustrating the pulse interval T1 between the non-ejection pulse P01 and the ejection pulse P1. FIG. 9 is a diagram illustrating the pulse interval T1 between the non-ejection pulse P02 and the ejection pulse P1. FIG. 8 illustrates an example in which the non-ejection pulse P01 is selected in a preceding cycle Tua of two consecutive cycles Tu among the repetitive cycles Tu, and the ejection pulse P1 is selected in a following cycle Tub. FIG. 9 illustrates an example in which the non-ejection pulse P02 is selected in the preceding cycle Tua, and the ejection pulse P1 is selected in the following cycle Tub.

Each of the non-ejection pulses P01 and P02 includes, at the beginning, the first expansion drive element a1 that drives the pressure generation unit 51*e* to expand the volume of the pressure chamber C. The ejection pulse P1 includes, at the beginning, the second expansion drive element s1 that drives the pressure generation unit 51*e* to expand the volume of the pressure chamber C. The first expansion drive element a1 and the second expansion drive element s1 are in the same phase.

The pulse interval T1 between the non-ejection pulse P01 or P02 of the preceding cycle Tua and the ejection pulse P1 of the following cycle Tub satisfies the following expression (1):

$$1.7\times Tc\times n\leq T1\leq 1.9\times Tc\times n \quad (1)$$

where Tc is a natural vibration cycle of the ejection section 510, and n is a natural number.

When the pulse interval T1 satisfies the expression (1), the instability of the ink ejection after the micro-vibration is suppressed compared to when the expression (1) is not satisfied. The pulse interval T1 in FIGS. 8 and 9 is a time interval between a half-value point A1 of a period of the first expansion drive element a1 of the non-ejection pulse P01 or P02 and a half-value point S1 of a period of the second expansion drive element s1 of the ejection pulse P1. The half-value point A1 is a value that is increased by 50% from the minimum potential a2 in the first expansion drive element a1. The half-value point S1 is a value that is increased by 50% from the minimum potential s2 in the second expansion drive element s1.

Figure 10:
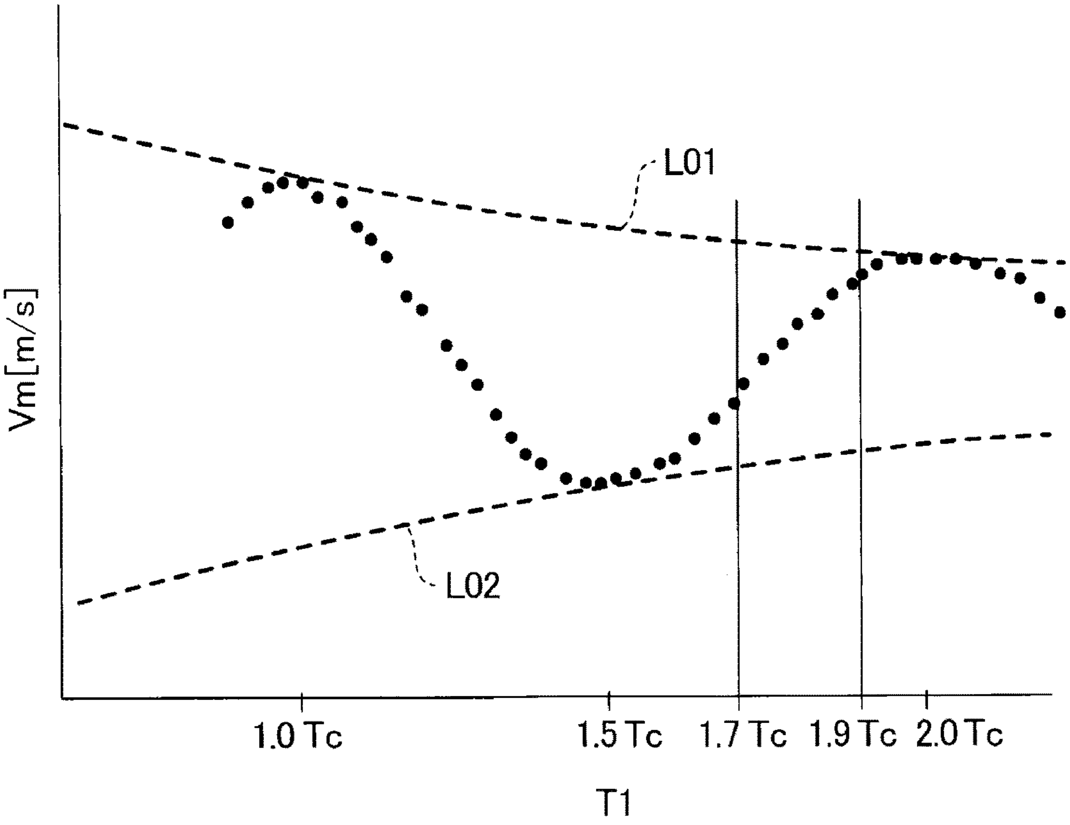
FIG. 10 is a diagram illustrating a relationship between the pulse interval and an ink droplet velocity of a first shot.

FIG. 10 is a diagram illustrating a relationship between the pulse interval T1 and an ink droplet velocity Vm of a first shot. FIG. 10 illustrates results of the ink droplet velocity Vm of the first shot when the pulse interval T1 is changed. A horizontal axis of FIG. 10 represents the pulse interval T1, and a vertical axis of FIG. 10 represents the ink droplet velocity Vm of the first shot. FIG. 10 illustrates the results of the ink droplet velocity Vm for the first shot when the non-ejection pulse including the first expansion drive element a1 at the beginning is applied, and then the ejection pulse including the second expansion drive element s1 at the beginning is applied. That is, FIG. 10 illustrates the results when the first drive element of the non-ejection pulse and the first drive element of the ejection pulse are in the same phase.

At a timing when the pressure vibration applied to the liquid in the pressure chamber C by the first drive element of the ejection pulse resonates with the residual vibration of the micro-vibration, the ink droplet velocity increases. When the ink droplet velocity is high, in the example of FIG. 10, the result approaches a dotted line L01. When the ink droplet velocity increases, the landing velocity of the ink droplets onto the medium M increases. On the other hand, at a timing when the pressure vibration applied to the liquid in the pressure chamber C by the first drive element of the ejection pulse is damped by the residual vibration of the micro-vibration, the ink droplet velocity decreases. When the ink droplet velocity is low, in the example of FIG. 10, the result approaches a dotted line L02. When the ink droplet velocity decreases, the landing velocity of the ink droplets onto the medium M decreases. Further, as the pulse interval T1 increases, that is, as the driving is performed with lower frequency, the change in the ink droplet velocity due to the residual vibration of the micro-vibration is smaller and converges to a certain value.

When such a change in the ink droplet velocity occurs, there is a risk of the deterioration in the image quality. In particular, when there is a significant velocity difference between the ink droplet velocity of the first shot, which is affected by the residual vibration, and the ink droplet velocity of a second shot, for example, there is a risk that white streaks appears on the medium M. Moreover, as the driving is performed with a higher frequency, the pulse interval T1 is likely to be shorter. Therefore, the ink ejection is likely to be affected by the residual waveform caused by the micro-vibration. Therefore, as the driving is performed with a higher frequency, the deterioration in the image quality due to the change in the ink droplet velocity is more likely to be occur.

As can be seen from FIG. 10, in order to suppress the influence of the residual vibration caused by the micro-vibration, it is preferable to set the pulse interval T1 such that the ink droplet velocity falls between the dotted line L01 and the dotted line L02. In other words, the timing when the ink droplet velocity of the first shot is less likely to resonate with or be damped by the residual vibration of the micro-vibration is preferable. Specifically, when the ejection pulse P1 is supplied immediately after the non-ejection pulse P01 or P02, the pulse interval T1 satisfies the expression (1), and thus the ink droplet velocity of the first shot is less likely to be affected by the residual vibration caused by the micro-vibration. Therefore, the instability of the ink ejection after the micro-vibration is suppressed. Therefore, the deterioration in the image quality can be suppressed.

Further, as described above, in the expression (1), n need only be a natural number, but it is preferable that n is 1. When n is 1, it is more adaptable to high-velocity driving as compared to when n is 2 or more.

Further, from the viewpoint of making the ink droplet velocity less likely to be affected by the micro-vibration, it is also conceivable that n in the expression (1) is not a natural number, but a natural number×0.5. However, since n is a natural number, the ink ejection stability can be improved as compared to when n is a natural number×0.5.

Further, whether to apply the non-ejection pulse P01 or P02 in the cycle Tua immediately preceding the cycle Tub in which the ejection pulse P1 is applied is, for example, appropriately selected based on a natural vibration cycle Tc of the ejection section 510. The natural vibration cycle Tc varies appropriately, for example, depending on an individual difference in the liquid ejection head 50, the type of the ink, and the like. For example, when the natural vibration cycle Tc exceeds a predetermined value, the non-ejection pulse P01 is selected, and when the natural vibration cycle Tc is equal to or less than the predetermined value, the non-ejection pulse P02 is selected.

Further, it is preferable that a pulse width T3 of each of the non-ejection pulses P01 and P02 illustrated in FIGS. 8 and 9 is 0.5 Tc. By setting the pulse width T3 to 0.5 Tc, it is possible to reduce the unintended vibration of the meniscus MN of the ink in the nozzle N as compared to other cases. Therefore, it is possible to reduce the ejection defect caused by the vibration, and the ink can be suitably stirred by the micro-vibration. Further, the pulse width T3 may be a value other than 0.5 Tc. Further, the natural vibration cycle Tc is, for example, 4 μsec or more and 12 μsec or less.

The pulse width T3 in FIGS. 8 and 9 is the time interval between the half-value point A1 and the half-value point A2 of the non-ejection pulses P01 or P02. The half-value point A2 is a value that is decreased by 50% from the minimum potential a2 in the first contraction drive element a3.

Figure 11:
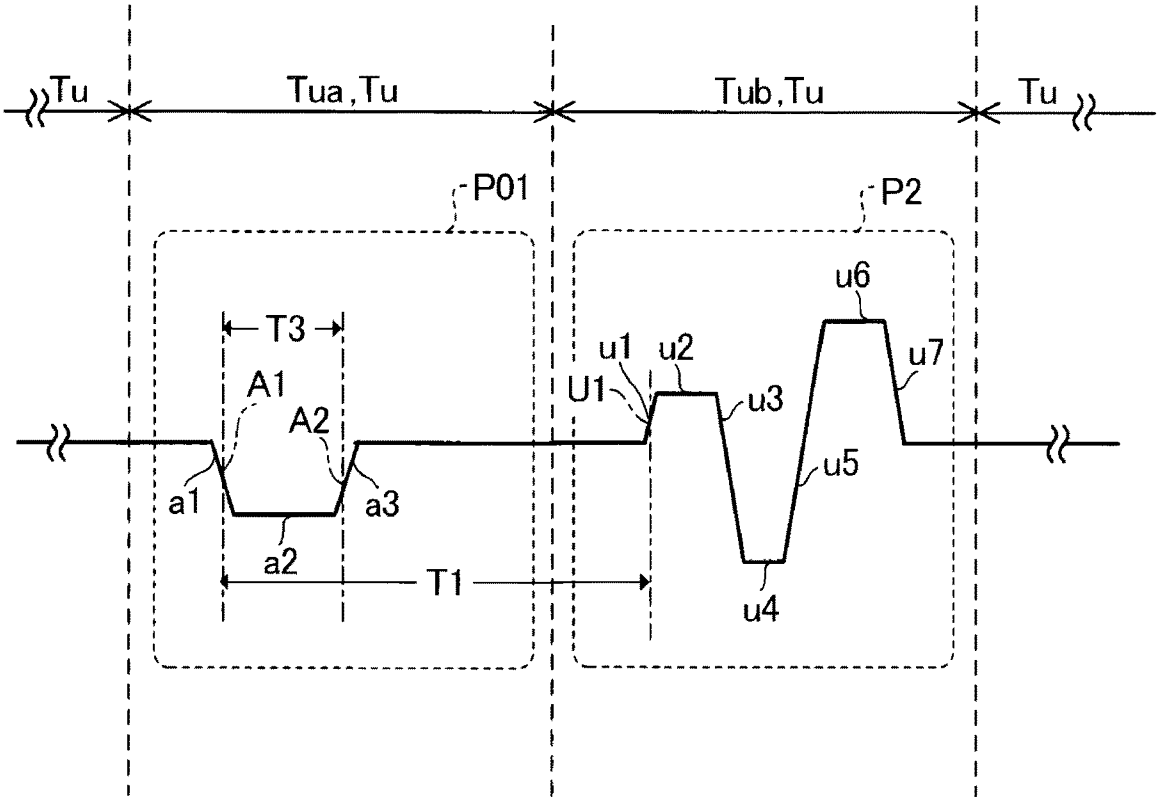
FIG. 11 is a diagram illustrating the pulse interval between the non-ejection pulse and the ejection pulse.
Figure 12:
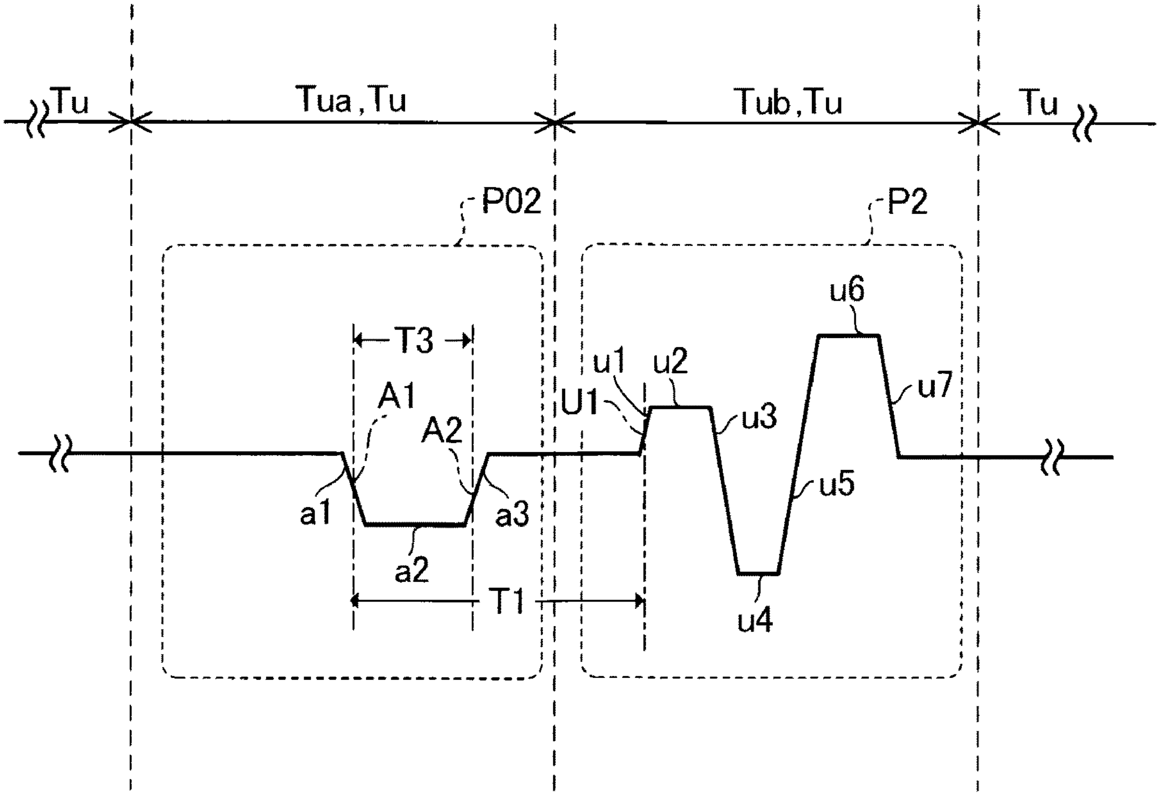
FIG. 12 is a diagram illustrating the pulse interval between the non-ejection pulse and the ejection pulse.

FIG. 11 is a diagram illustrating the pulse interval T1 between the non-ejection pulse P01 and the ejection pulse P2. FIG. 12 is a diagram illustrating the pulse interval T1 between the non-ejection pulse P02 and the ejection pulse P2. FIG. 11 illustrates an example in which the non-ejection pulse P01 is selected in the preceding cycle Tua, and the ejection pulse P2 is selected in the following cycle Tub. FIG. 12 illustrates an example in which the non-ejection pulse P02 is selected in the preceding cycle Tua, and the ejection pulse P2 is selected in the following cycle Tub.

Each of the non-ejection pulses P01 and P02 includes, at the beginning, the first expansion drive element a1 that drives the pressure generation unit 51*e* to expand the volume of the pressure chamber C. The ejection pulse P2 includes, at the beginning, the preparatory contraction drive element u1 that drives the pressure generation unit 51*e* to contract the volume of the pressure chamber C. The first expansion drive element a1 and the preparatory contraction drive element u1 are in opposite phases.

The pulse interval T1 between the non-ejection pulse P01 or P02 of the preceding cycle Tua and the ejection pulse P2 of the following cycle Tub satisfies the following expression (2):

$$1.2\times Tc\times n\leq T1\leq 1.4\times Tc\times n \quad (2)$$

where Tc is a natural vibration cycle of the ejection section 510, and n is a natural number.

When the pulse interval T1 satisfies the expression (2), the instability of the ink ejection after the micro-vibration is suppressed compared to when the expression (2) is not satisfied. The pulse interval T1 in FIGS. 11 and 12 is a time interval between the half-value point A1 of the period of the first expansion drive element a1 of the non-ejection pulse P01 or P02 and a half-value point U1 of a period of the preparatory contraction drive element u1 of the ejection pulse P2. The half-value point A1 is a value that is increased by 50% from the minimum potential a2 in the first expansion drive element a1. The half-value point U1 is a value that is decreased by 50% from the high potential u2 in the preparatory contraction drive element u1.

Figure 13:
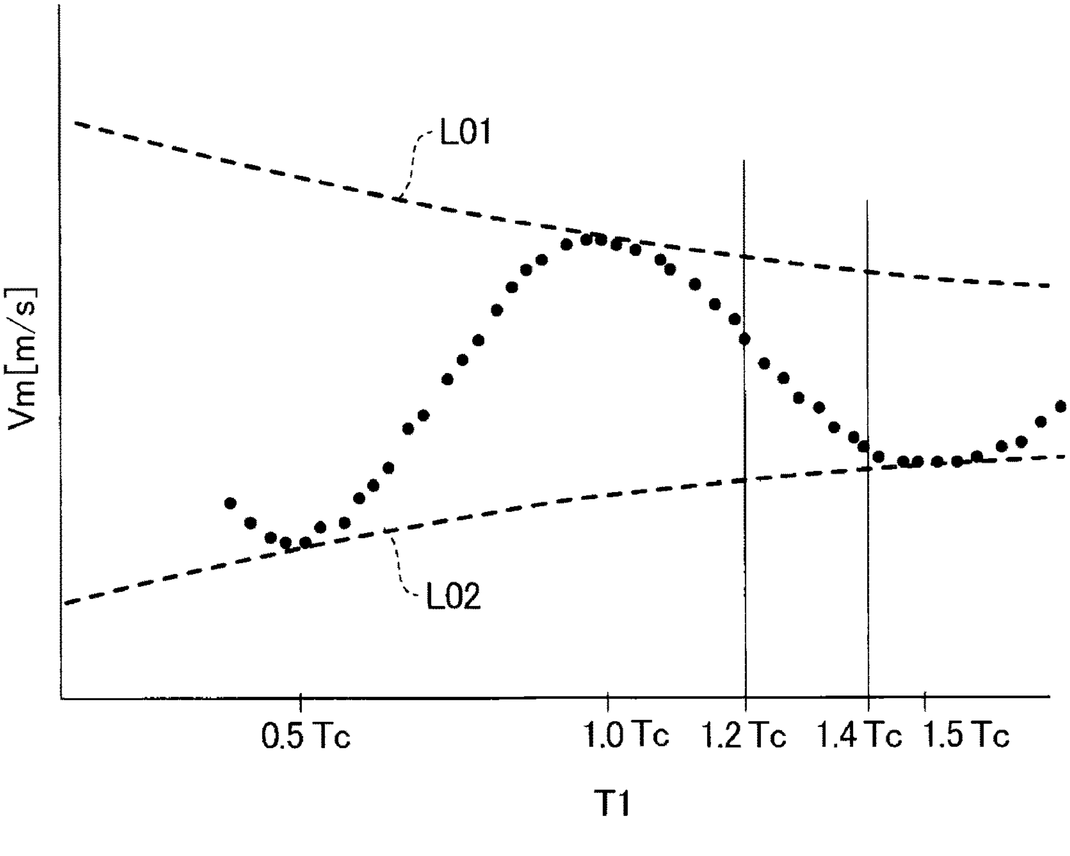
FIG. 13 is a diagram illustrating a relationship between the pulse interval and the ink droplet velocity of the first shot.

FIG. 13 is a diagram illustrating a relationship between the pulse interval T1 and the ink droplet velocity Vm of a first shot. FIG. 13 illustrates results of the ink droplet velocity Vm of the first shot when the pulse interval T1 is changed. A horizontal axis of FIG. 13 represents the pulse interval T1, and a vertical axis of FIG. 13 represents the ink droplet velocity Vm of the first shot. FIG. 13 illustrates the results of the ink droplet velocity Vm for the first shot when the non-ejection pulse including the first expansion drive element a1 at the beginning is applied, and then the ejection pulse including the preparatory contraction drive element u1 at the beginning is applied. That is, FIG. 13 illustrates the results when the first drive element of the non-ejection pulse and the first drive element of the ejection pulse are in opposite phases.

At a timing when the pressure vibration applied to the liquid in the pressure chamber C by the first drive element of the ejection pulse resonates with the residual vibration of the micro-vibration, the landing velocity of the ink droplets onto the medium M increases. On the other hand, at a timing when the pressure vibration applied to the liquid in the pressure chamber C by the first drive element of the ejection pulse is damped by the residual vibration of the micro-vibration, the landing velocity of the ink droplets onto the medium M decreases. As the pulse interval T1 increases, that is, as the driving is performed with lower frequency, the change in the ink droplet velocity due to the residual vibration of the micro-vibration is smaller and converges to a certain value. When such a change in the ink droplet velocity occurs, there is a risk of the deterioration in the image quality. Moreover, as the driving is performed with a higher frequency, the pulse interval T1 is likely to be shorter. Therefore, the ink ejection is likely to be affected by the residual waveform caused by the micro-vibration. Therefore, as the driving is performed with a higher frequency, the deterioration in the image quality due to the change in the ink droplet velocity is more likely to be occur.

As can be seen from FIG. 13, in order to suppress the influence of the residual vibration caused by the micro-vibration, it is preferable to set the pulse interval T1 such that the ink droplet velocity falls between the dotted line L01 and the dotted line L02. Specifically, when the ejection pulse P2 is supplied immediately after the non-ejection pulse P01 or P02, the pulse interval T1 satisfies the expression (2), and thus the ink droplet velocity of the first shot is less likely to be affected by the residual vibration caused by the micro-vibration. Therefore, the instability of the ink ejection after the micro-vibration is suppressed. Therefore, the deterioration in the image quality can be suppressed.

Further, in the expression (2), n need only be a natural number, but it is preferable that n is 1. When n is 1, it is more adaptable to high-velocity driving as compared to when n is 2 or more.

Further, from the viewpoint of making the ink droplet velocity less likely to be affected by the micro-vibration, it is also conceivable that n in the expression (2) is not a natural number, but a natural number×0.5. However, since n is a natural number, the ink ejection stability can be improved as compared to when n is a natural number×0.5.

Figure 14:
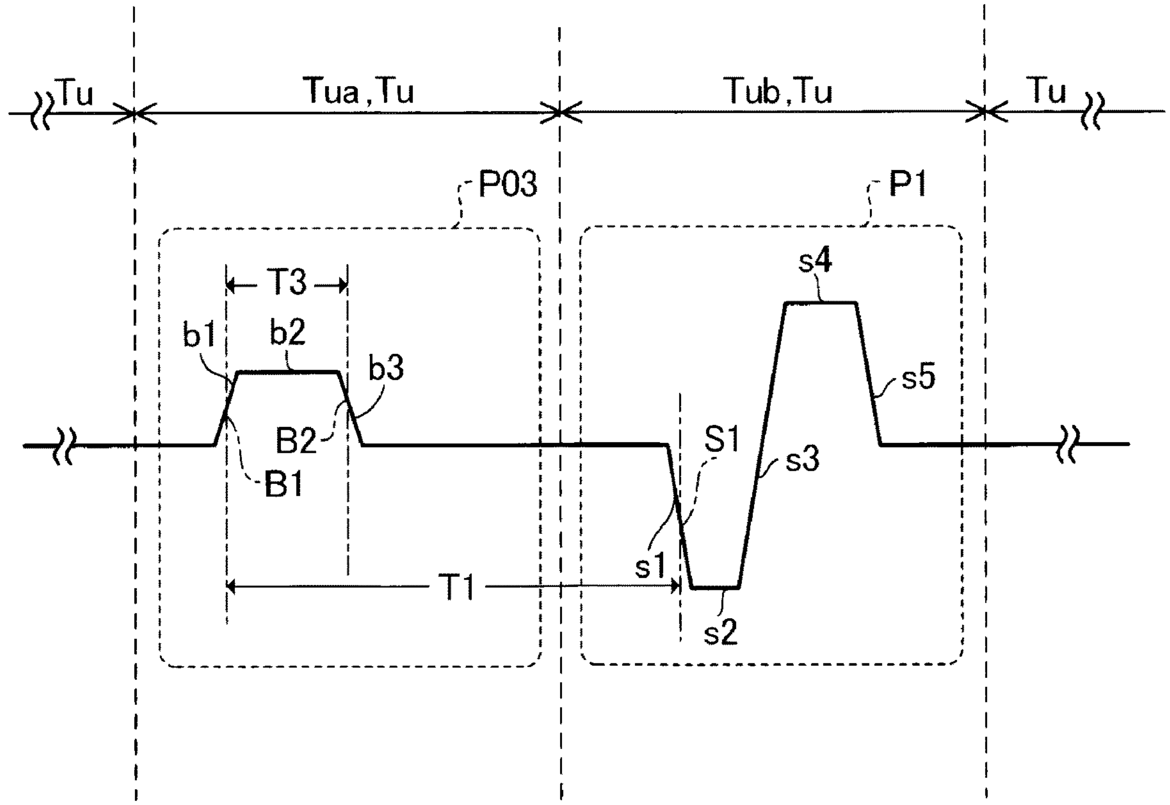
FIG. 14 is a diagram illustrating the pulse interval between the non-ejection pulse and the ejection pulse.
Figure 15:
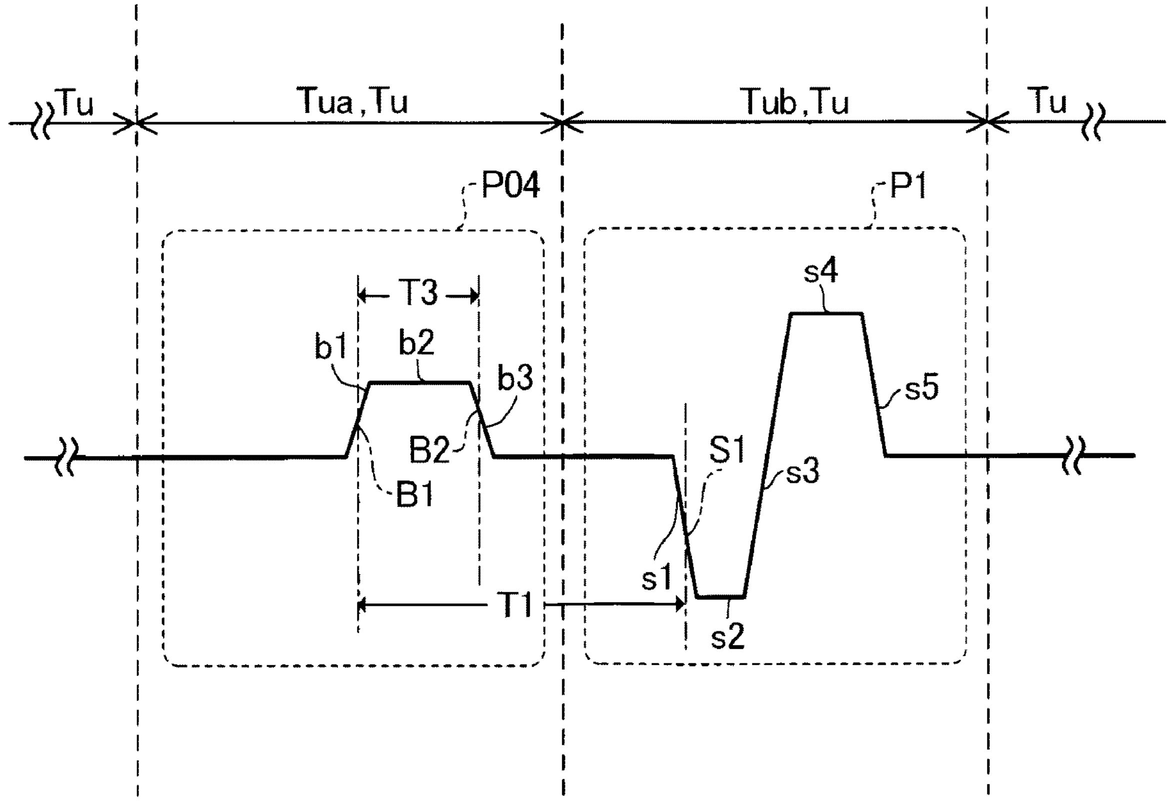
FIG. 15 is a diagram illustrating the pulse interval between the non-ejection pulse and the ejection pulse.

FIG. 14 is a diagram illustrating the pulse interval T1 between the non-ejection pulse P03 and the ejection pulse P1. FIG. 15 is a diagram illustrating the pulse interval T1 between the non-ejection pulse P04 and the ejection pulse P1. FIG. 14 illustrates an example in which the non-ejection pulse P03 is selected in the preceding cycle Tua, and the ejection pulse P1 is selected in the following cycle Tub. FIG. 15 illustrates an example in which the non-ejection pulse P04 is selected in the preceding cycle Tua, and the ejection pulse P1 is selected in the following cycle Tub.

Each of the non-ejection pulses P03 and P04 includes, at the beginning, the first contraction drive element b1 that drives the pressure generation unit 51*e* to contract the volume of the pressure chamber C. The ejection pulse P1 includes, at the beginning, the second expansion drive element s1 that drives the pressure generation unit 51*e* to expand the volume of the pressure chamber C. The first contraction drive element b1 and the second expansion drive element s1 are in opposite phases.

The pulse interval T1 between the non-ejection pulse P03 or P04 of the preceding cycle Tua and the ejection pulse P1 of the following cycle Tub satisfies the expression (2). That is, when the first drive element of the non-ejection pulse is the first contraction drive element b1, and the first drive element of the ejection pulse is the second expansion drive element s1, the pulse interval T1 satisfies the expression (2). When the pulse interval T1 satisfies the expression (2), the instability of the ink ejection after the micro-vibration is suppressed compared to when the expression (2) is not satisfied. Therefore, the deterioration in the image quality can be suppressed.

In the examples illustrated in FIGS. 14 and 15, the pulse interval T1 is the time interval between a half-value point B1 of a period of the first contraction drive element b1 of the non-ejection pulse P03 or P04 and the half-value point S1 of the period of the second expansion drive element s1 of the ejection pulse P1. The half-value point B1 is a value that is decreased by 50% from the maximum potential b2 in the first contraction drive element b1. The half-value point S1 is a value that is increased by 50% from the minimum potential s2 in the second expansion drive element s1.

Figure 16:
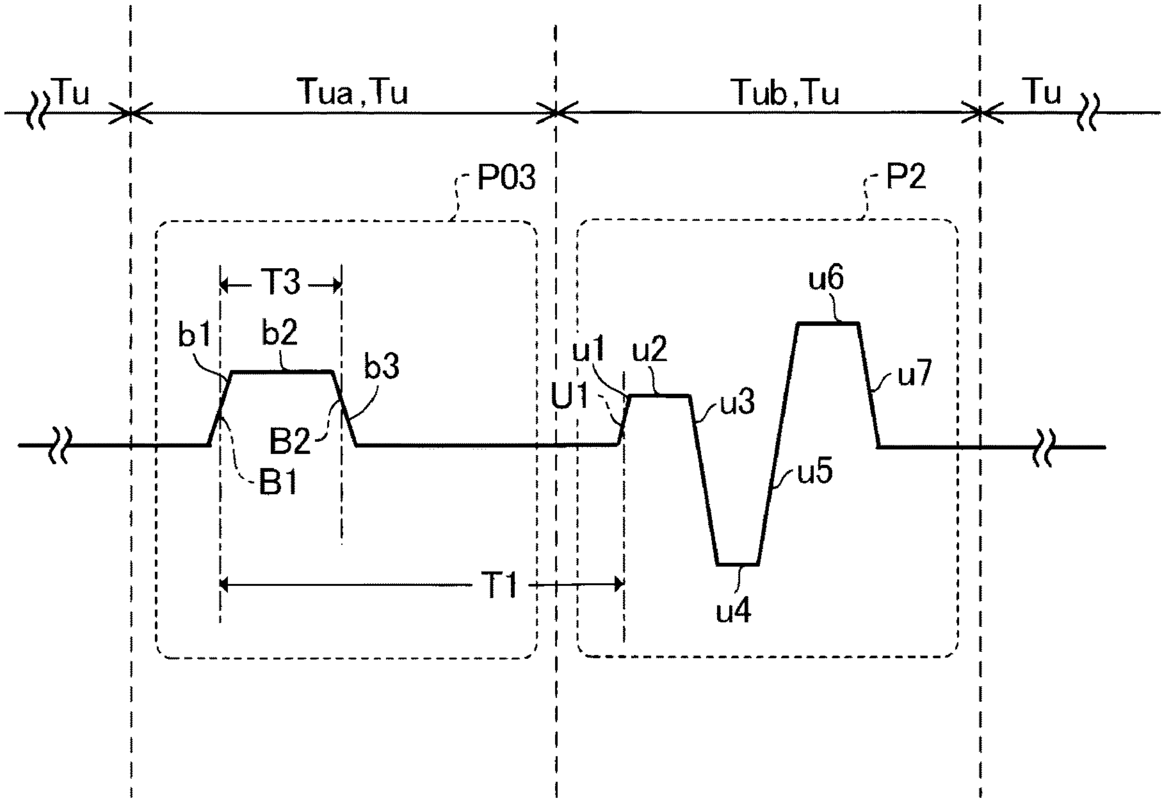
FIG. 16 is a diagram illustrating the pulse interval between the non-ejection pulse and the ejection pulse.
Figure 17:
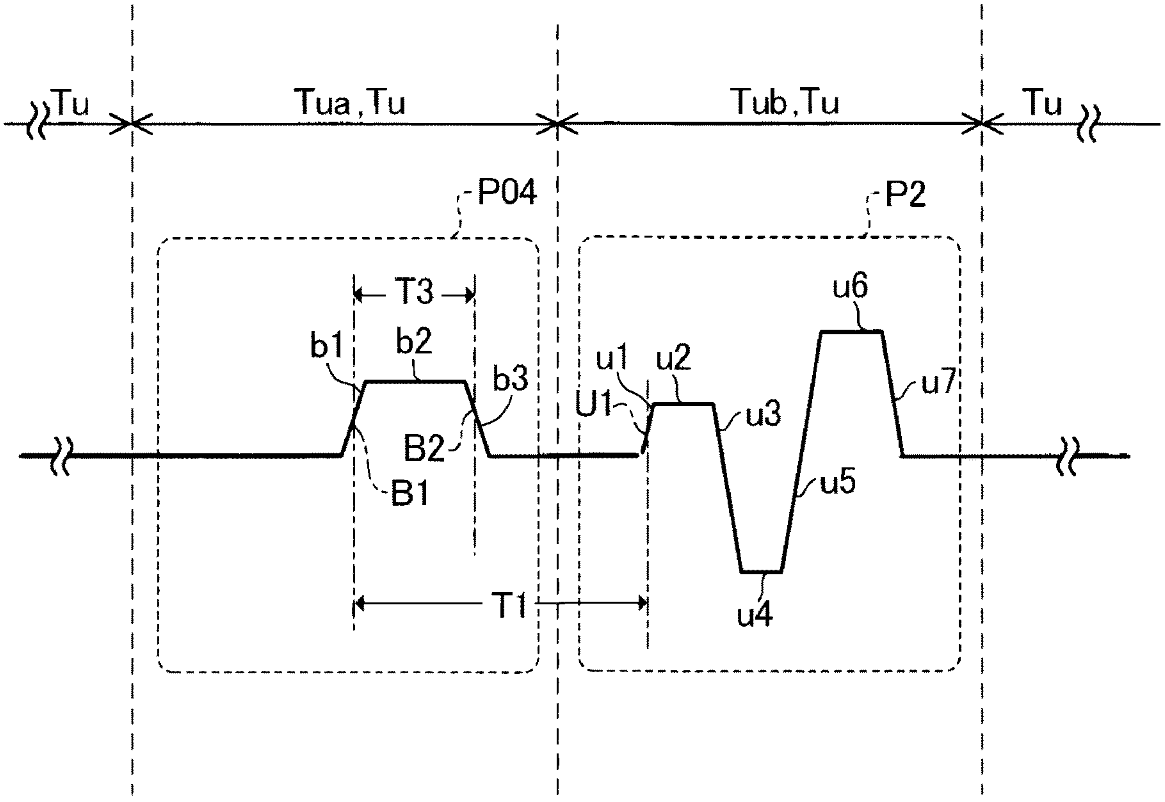
FIG. 17 is a diagram illustrating the pulse interval between the non-ejection pulse and the ejection pulse.

FIG. 16 is a diagram illustrating the pulse interval T1 between the non-ejection pulse P03 and the ejection pulse P2. FIG. 17 is a diagram illustrating the pulse interval T1 between the non-ejection pulse P04 and the ejection pulse P2. FIG. 16 illustrates an example in which the non-ejection pulse P03 is selected in the preceding cycle Tua, and the ejection pulse P2 is selected in the following cycle Tub. FIG. 17 illustrates an example in which the non-ejection pulse P04 is selected in the preceding cycle Tua, and the ejection pulse P2 is selected in the following cycle Tub.

Each of the non-ejection pulses P03 and P04 includes, at the beginning, the first contraction drive element b1 that drives the pressure generation unit 51*e* to contract the volume of the pressure chamber C. The ejection pulse P2 includes, at the beginning, the preparatory contraction drive element u1 that drives the pressure generation unit 51*e* to contract the volume of the pressure chamber C. The first contraction drive element b1 and the preparatory contraction drive element u1 are in the same phase.

The pulse interval T1 between the non-ejection pulse P03 or P04 of the preceding cycle Tua and the ejection pulse P2 of the following cycle Tub satisfies the expression (1). That is, when the first drive element of the non-ejection pulse is the first contraction drive element b1, and the first drive element of the ejection pulse is the preparatory contraction drive element u1, the pulse interval T1 satisfies the expression (1). When the pulse interval T1 satisfies the expression (1), the instability of the ink ejection after the micro-vibration is suppressed compared to when the expression (1) is not satisfied. Therefore, the deterioration in the image quality can be suppressed.

In the examples illustrated in FIGS. 16 and 17, the pulse interval T1 is the time interval between the half-value point B1 of the period of the first contraction drive element b1 of the non-ejection pulse P03 or P04 and the half-value point U1 of the period of the preparatory contraction drive element u1 of the ejection pulse P2. The half-value point B1 is a value that is decreased by 50% from the maximum potential b2 in the first contraction drive element b1. The half-value point U1 is a value that is decreased by 50% from the high potential u2 in the preparatory contraction drive element u1.

The natural vibration cycle Tc of the ejection section 510 varies appropriately, for example, depending on the individual difference in the liquid ejection head 50, the type of the ink, and the like. Therefore, in the selection of whether to apply the non-ejection pulse P01, P02, P03, or P04 in the cycle Tua immediately preceding the cycle Tub in which the ejection pulse P1 is applied, the non-ejection pulse of the non-ejection pulses P01 and P02, of which the pulse interval T1 with the ejection pulse P1 satisfies the expression (1), or the non-ejection pulse of the non-ejection pulses P03 and P04, of which the pulse interval T1 with the ejection pulse P1 satisfies the expression (2) is selected. Further, in the selection of whether to apply the non-ejection pulse P01, P02, P03, or P04 in the cycle Tua immediately preceding the cycle Tub in which the ejection pulse P2 is applied, the non-ejection pulse of the non-ejection pulses P01 and P02, of which the pulse interval T1 with the ejection pulse P2 satisfies the expression (2), or the non-ejection pulse of the non-ejection pulses P03 and P04, of which the pulse interval T1 with the ejection pulse P2 satisfies the expression (1) is selected.

As described above, when the first drive element of the non-ejection pulse and the first drive element of the ejection pulse immediately after the non-ejection pulse is applied are in the same phase, the pulse interval T1 satisfies the expression (1). When the first drive element of the non-ejection pulse and the first drive element of the ejection pulse immediately after the non-ejection pulse is applied are in opposite phases, the pulse interval T1 satisfies the expression (2). In this way, a liquid ejection method executed by the liquid ejection apparatus 100 is driven such that the pulse interval T1 satisfies the expression (1) or (2). With such a method, the influence of the residual vibration caused by the micro-vibration of the meniscus MN due to the application of the non-ejection pulse is prevented from affecting the ink ejection immediately after the micro-vibration. Therefore, the instability of the ink ejection after the micro-vibration is suppressed. Therefore, the deterioration in the image quality can be suppressed.

2. SECOND EMBODIMENT

Hereinafter, a second embodiment of the present disclosure will be described. In the embodiment described below, elements of which the actions or functions are the same as those in the first embodiment will be denoted by the same reference numerals used in the description of the first embodiment, and the detailed description thereof will be omitted as appropriate.

In the first embodiment, the instability of the ink ejection after the micro-vibration is suppressed by setting the pulse interval T1. In contrast, in the present embodiment, the instability of the ink ejection after the micro-vibration is suppressed by setting a coupling interval T2.

Figure 18:
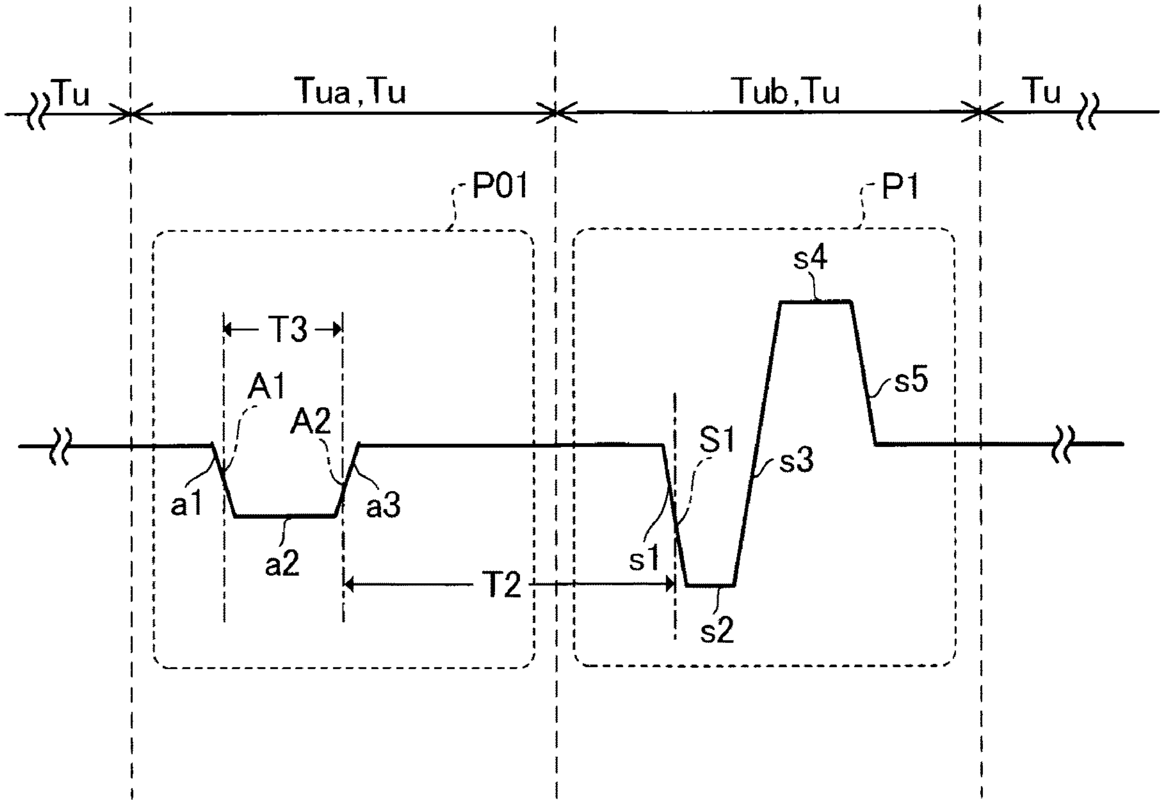
FIG. 18 is a diagram illustrating a coupling interval between the non-ejection pulse and the ejection pulse.
Figure 19:
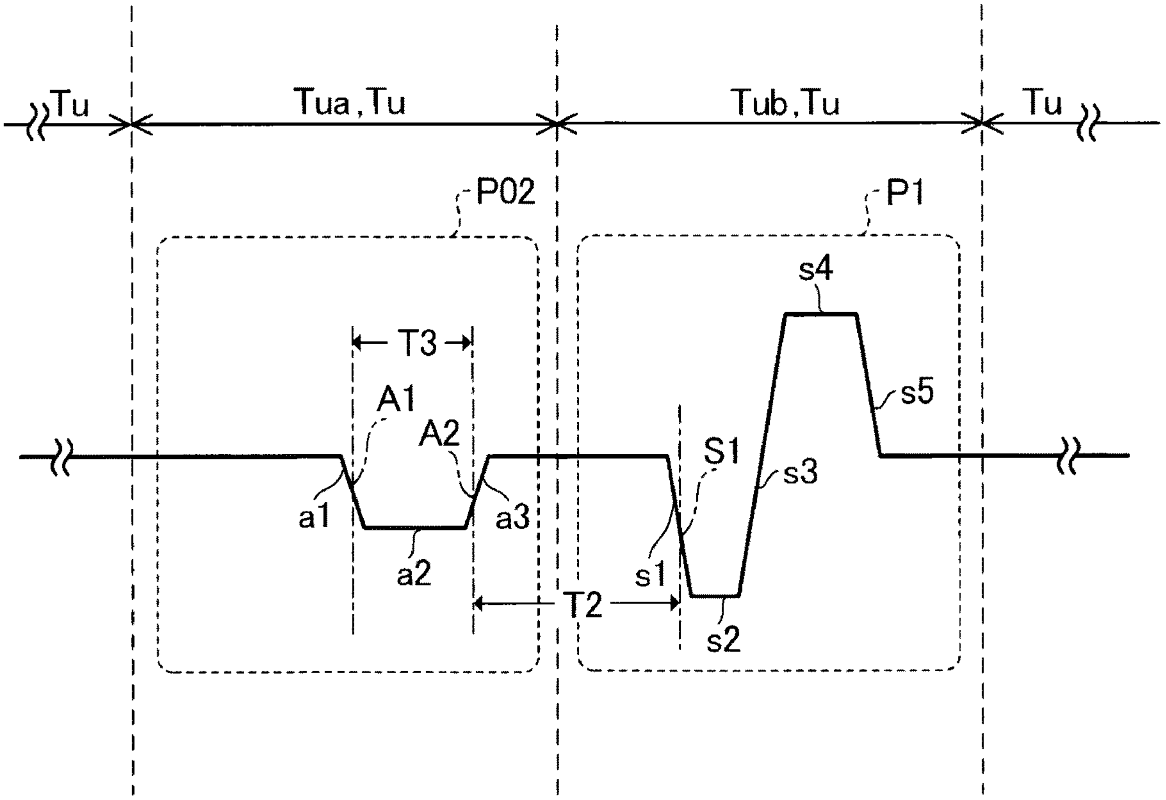
FIG. 19 is a diagram illustrating the coupling interval between the non-ejection pulse and the ejection pulse.

FIG. 18 is a diagram illustrating the coupling interval T2 between the non-ejection pulse P01 and the ejection pulse P1. FIG. 19 is a diagram illustrating the coupling interval T2 between the non-ejection pulse P02 and the ejection pulse P1. FIG. 18 illustrates an example in which the non-ejection pulse P01 is selected in the preceding cycle Tua, and the ejection pulse P1 is selected in the following cycle Tub. FIG. 19 illustrates an example in which the non-ejection pulse P02 is selected in the preceding cycle Tua, and the ejection pulse P1 is selected in the following cycle Tub.

Each of the non-ejection pulses P01 and P02 includes, at the end, the first contraction drive element a3 that drives the pressure generation unit 51*e* to contract the volume of the pressure chamber C. The ejection pulse P1 includes, at the beginning, the second expansion drive element s1 that drives the pressure generation unit 51*e* to expand the volume of the pressure chamber C. The first contraction drive element a3 and the second expansion drive element s1 are in opposite phases.

The coupling interval T2 between the non-ejection pulse P01 or P02 of the preceding cycle Tua and the ejection pulse P1 of the following cycle Tub satisfies the expression (2):

$$1.2 \times Tc \times n \leq T2 \leq 1.4 \times Tc \times n \quad (2)$$

where Tc is a natural vibration cycle of the ejection section 510, and n is a natural number.

When the last drive element of the non-ejection pulse is the first contraction drive element a3, and the first drive element of the ejection pulse is the second expansion drive element s1, the coupling interval T2 satisfies the expression (2). When the coupling interval T2 satisfies the expression (2), the instability of the ink ejection after the micro-vibration is suppressed compared to when the expression (2) is not satisfied, as in the first embodiment.

In FIGS. 18 and 19, the coupling interval T2 is a time interval between the half-value point A2 of the period of the first contraction drive element a3 of the non-ejection pulse P01 or P02 and the half-value point S1 of the period of the second expansion drive element s1 of the ejection pulse P1. The half-value point A2 is a value that is increased by 50% from the minimum potential a2 in the first contraction drive element a3. The half-value point S3 is a value that is increased by 50% from the minimum potential s2 in the second expansion drive element s1.

Further, in the expression (2), n need only be a natural number, but it is preferable that n is 1. When n is 1, it is more adaptable to high-velocity driving as compared to when n is 2 or more.

Further, from the viewpoint of suppressing the resonance and the damping of the ink droplet velocity, it is also conceivable that n in the expression (2) is not a natural number, but a natural number×0.5. However, since n is a natural number, the ink ejection stability can be improved as compared to when n is a natural number×0.5.

Further, as illustrated in FIGS. 18 and 19, it is preferable that the pulse width T3 of each of the non-ejection pulses P01 and P02 is 0.5 Tc, as in the first embodiment. By setting the pulse width T3 to 0.5 Tc, it is possible to reduce the unintended vibration of the meniscus MN of the ink in the nozzle N as compared to other cases. Therefore, it is possible to reduce the ejection defect caused by the vibration, and the ink can be suitably stirred by the micro-vibration.

Figure 20:
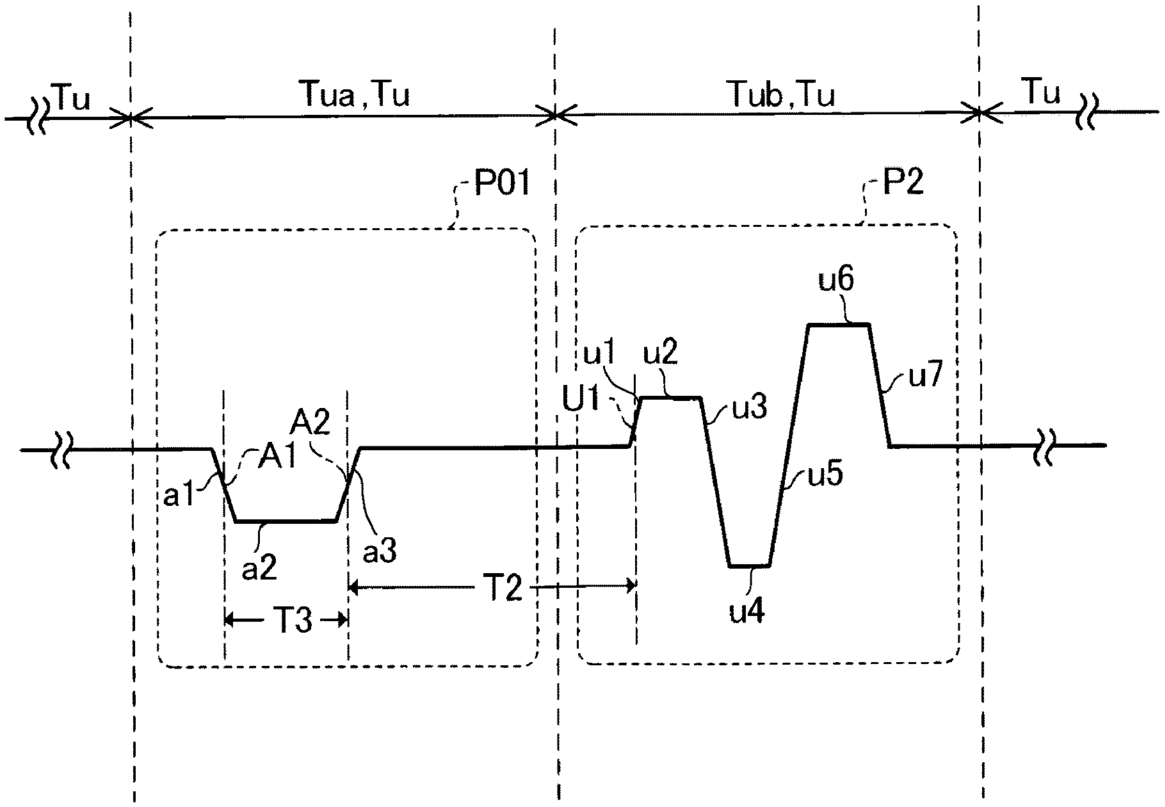
FIG. 20 is a diagram illustrating the coupling interval between the non-ejection pulse and the ejection pulse.
Figure 21:
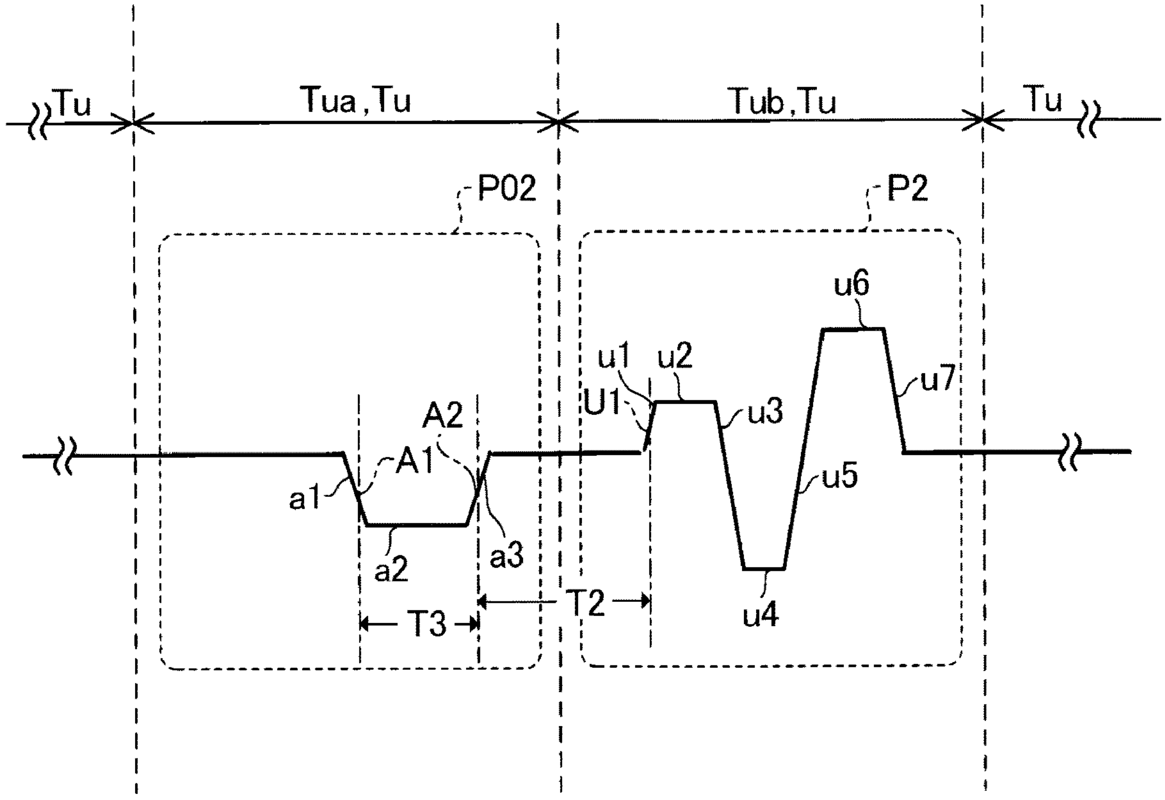
FIG. 21 is a diagram illustrating the coupling interval between the non-ejection pulse and the ejection pulse.

FIG. 20 is a diagram illustrating the coupling interval T2 between the non-ejection pulse P01 and the ejection pulse P2. FIG. 21 is a diagram illustrating the coupling interval T2 between the non-ejection pulse P02 and the ejection pulse P2. FIG. 20 illustrates an example in which the non-ejection pulse P01 is selected in the preceding cycle Tua, and the ejection pulse P2 is selected in the following cycle Tub. FIG. 21 illustrates an example in which the non-ejection pulse P02 is selected in the preceding cycle Tua, and the ejection pulse P2 is selected in the following cycle Tub.

Each of the non-ejection pulses P01 and P02 includes, at the end, the first contraction drive element a3 that drives the pressure generation unit 51*e* to contract the volume of the pressure chamber C. The ejection pulse P2 includes, at the beginning, the preparatory contraction drive element u1 that drives the pressure generation unit 51*e* to contract the volume of the pressure chamber C. The first contraction drive element a3 and the preparatory contraction drive element u1 are in the same phase.

The coupling interval T2 between the non-ejection pulse P01 or P02 of the preceding cycle Tua and the ejection pulse P2 of the following cycle Tub satisfies the expression (1)

$$1.7\times Tc\times n\leq T2\leq 1.9\times Tc\times n \quad (1)$$

where Tc is a natural vibration cycle of the ejection section 510, and n is a natural number.

When the last drive element of the non-ejection pulse is the first contraction drive element a3, and the first drive element of the ejection pulse is the preparatory contraction drive element u1, the coupling interval T2 satisfies the expression (1). When the coupling interval T2 satisfies the expression (1), the instability of the ink ejection after the micro-vibration is suppressed compared to when the expression (1) is not satisfied, as in the first embodiment.

In FIGS. 20 and 21, the coupling interval T2 is a time interval between the half-value point A2 of the period of the first contraction drive element a3 of the non-ejection pulse P01 or P02 and the half-value point U1 of the period of the preparatory contraction drive element u1 of the ejection pulse P2. The half-value point A2 is a value that is increased by 50% from the minimum potential a2 in the first contraction drive element a3. The half-value point U1 is a value that is decreased by 50% from the high potential u2 in the preparatory contraction drive element u1.

Further, in the expression (1), n need only be a natural number, but it is preferable that n is 1. When n is 1, it is more adaptable to high-velocity driving as compared to when n is 2 or more.

Further, from the viewpoint of suppressing the resonance and the damping of the ink droplet velocity, it is also conceivable that n in the expression (1) is not a natural number, but a natural number×0.5. However, since n is a natural number, the ink ejection stability can be improved as compared to when n is a natural number×0.5.

Figure 22:
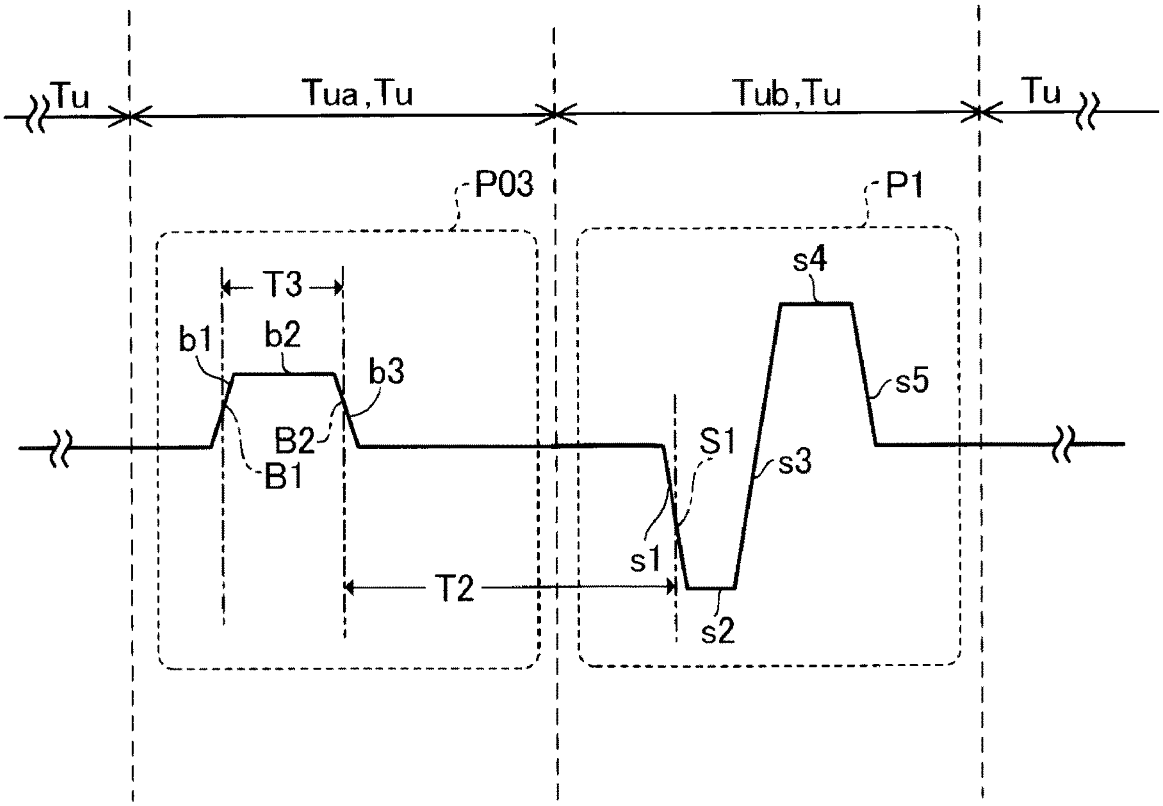
FIG. 22 is a diagram illustrating the coupling interval between the non-ejection pulse and the ejection pulse.
Figure 23:
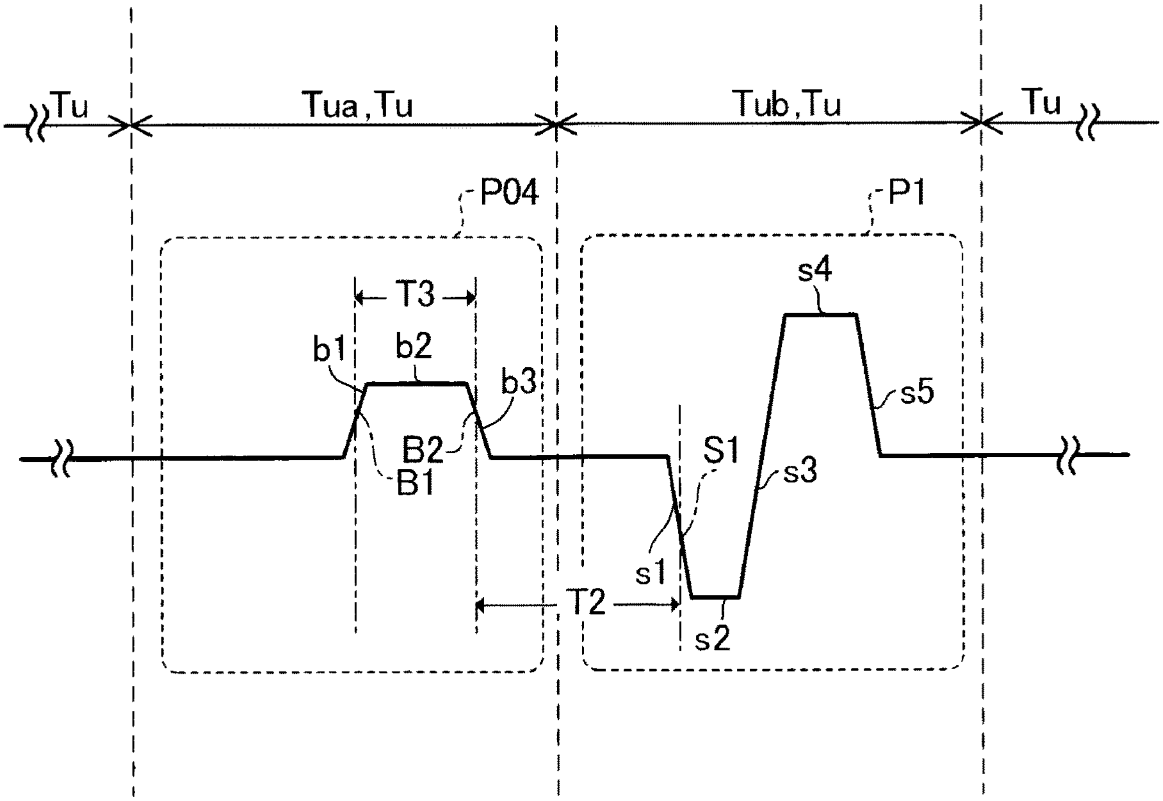
FIG. 23 is a diagram illustrating the coupling interval between the non-ejection pulse and the ejection pulse.

FIG. 22 is a diagram illustrating the coupling interval T2 between the non-ejection pulse P03 and the ejection pulse P1. FIG. 23 is a diagram illustrating the coupling interval T2 between the non-ejection pulse P04 and the ejection pulse P1. FIG. 22 illustrates an example in which the non-ejection pulse P03 is selected in the preceding cycle Tua, and the ejection pulse P1 is selected in the following cycle Tub. FIG. 23 illustrates an example in which the non-ejection pulse P04 is selected in the preceding cycle Tua, and the ejection pulse P1 is selected in the following cycle Tub.

Each of the non-ejection pulses P03 and P04 includes, at the end, the first expansion drive element b3 that drives the pressure generation unit 51*e* to expand the volume of the pressure chamber C. The ejection pulse P1 includes, at the beginning, the second expansion drive element s1 that drives the pressure generation unit 51*e* to expand the volume of the pressure chamber C. The first expansion drive element b3 and the second expansion drive element s1 are in the same phase.

The coupling interval T2 between the non-ejection pulse P03 or P04 of the preceding cycle Tua and the ejection pulse P1 of the following cycle Tub satisfies the expression (1). That is, when the last drive element of the non-ejection pulse is the first expansion drive element b3, and the first drive element of the ejection pulse is the second expansion drive element s1, the coupling interval T2 satisfies the expression (1). When the coupling interval T2 satisfies the expression (1), the instability of the ink ejection after the micro-vibration is suppressed compared to when the expression (1) is not satisfied, as in the first embodiment.

In FIGS. 21 and 23, the coupling interval T2 is a time interval between the half-value point B2 of a period of the first expansion drive element b3 of the non-ejection pulse P03 or P04 and the half-value point S1 of the period of the second expansion drive element s1 of the ejection pulse P1. The half-value point B3 is a value that is decreased by 50% from the maximum potential b2 in the first expansion drive element b3. The half-value point S1 is a value that is increased by 50% from the minimum potential s2 in the second expansion drive element s1.

Figure 24:
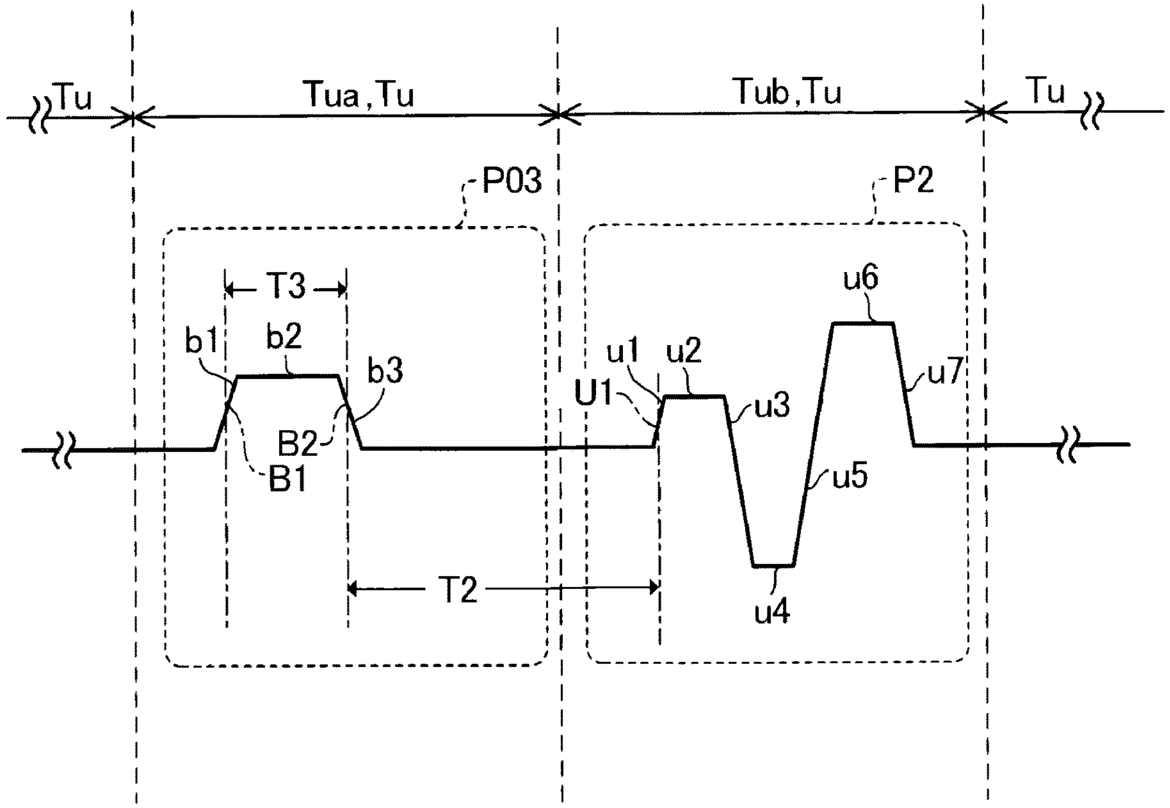
FIG. 24 is a diagram illustrating the coupling interval between the non-ejection pulse and the ejection pulse.
Figure 25:
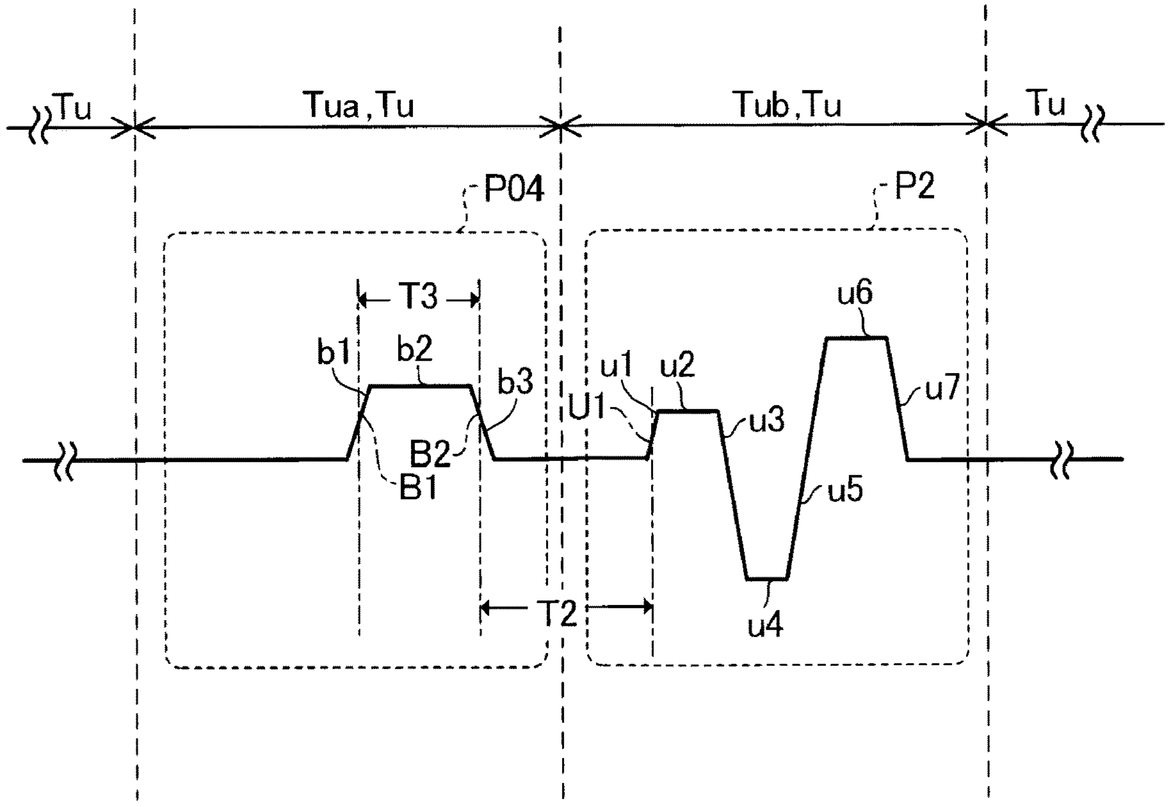
FIG. 25 is a diagram illustrating the coupling interval between the non-ejection pulse and the ejection pulse.

FIG. 24 is a diagram illustrating the coupling interval T2 between the non-ejection pulse P03 and the ejection pulse P2. FIG. 25 is a diagram illustrating the coupling interval T2 between the non-ejection pulse P04 and the ejection pulse P2. FIG. 24 illustrates an example in which the non-ejection pulse P03 is selected in the preceding cycle Tua, and the ejection pulse P2 is selected in the following cycle Tub. FIG. 25 illustrates an example in which the non-ejection pulse P04 is selected in the preceding cycle Tua, and the ejection pulse P2 is selected in the following cycle Tub.

Each of the non-ejection pulses P03 and P04 includes, at the end, the first expansion drive element b3 that drives the pressure generation unit 51*e* to expand the volume of the pressure chamber C. The ejection pulse P2 includes, at the beginning, the preparatory contraction drive element u1 that drives the pressure generation unit 51*e* to contract the volume of the pressure chamber C. The first expansion drive element b3 and the preparatory contraction drive element u1 are in opposite phases.

The coupling interval T2 between the non-ejection pulse P03 or P04 of the preceding cycle Tua and the ejection pulse P2 of the following cycle Tub satisfies the expression (2). That is, when the last drive element of the non-ejection pulse is the first expansion drive element b3, and the first drive element of the ejection pulse is the preparatory contraction drive element u1, the coupling interval T2 satisfies the expression (2). When the coupling interval T2 satisfies the expression (2), the instability of the ink ejection after the micro-vibration is suppressed compared to when the expression (2) is not satisfied, as in the first embodiment.

In FIGS. 24 and 25, the coupling interval T2 is a time interval between the half-value point B2 of the period of the first expansion drive element b3 of the non-ejection pulse P03 or P04 and the half-value point U1 of the period of the preparatory contraction drive element u1 of the ejection pulse P2. The half-value point B3 is a value that is decreased by 50% from the maximum potential b2 in the first expansion drive element b3. The half-value point U1 is a value that is decreased by 50% from the high potential u2 in the preparatory contraction drive element u1.

The natural vibration cycle Tc of the ejection section 510 varies appropriately, for example, depending on the individual difference in the liquid ejection head 50, the type of the ink, and the like. Therefore, in the selection of whether to apply the non-ejection pulse P01, P02, P03, or P04 in the cycle Tua immediately preceding the cycle Tub in which the ejection pulse P1 is applied, the non-ejection pulse of the non-ejection pulses P01 and P02, of which the coupling interval T2 with the ejection pulse P1 satisfies the expression (2), or the non-ejection pulse of the non-ejection pulses P03 and P04, of which the coupling interval T2 with the ejection pulse P1 satisfies the expression (1) is selected. Further, in the selection of whether to apply the non-ejection pulse P01, P02, P03, or P04 in the cycle Tua immediately preceding the cycle Tub in which the ejection pulse P2 is applied, the non-ejection pulse of the non-ejection pulses P01 and P02, of which the coupling interval T2 with the ejection pulse P2 satisfies the expression (1), or the non-ejection pulse of the non-ejection pulses P03 and P04, of which the coupling interval T2 with the ejection pulse P2 satisfies the expression (2) is selected.

As described above, when the last drive element of the non-ejection pulse and the first drive element of the ejection pulse immediately after the non-ejection pulse is applied are in the same phase, the coupling interval T2 satisfies the expression (1). When the last drive element of the non-ejection pulse and the first drive element of the ejection pulse immediately after the non-ejection pulse is applied are in opposite phases, the coupling interval T2 satisfies the expression (2). In this way, a liquid ejection method executed by the liquid ejection apparatus 100 is driven such that the coupling interval T2 satisfies the expression (1) or (2). With such a method, the influence of the residual vibration caused by the micro-vibration of the meniscus MN due to the application of the non-ejection pulse is prevented from affecting the ink ejection immediately after the micro-vibration. Therefore, the instability of the ink ejection after the micro-vibration is suppressed. Therefore, the deterioration in the image quality can be suppressed.

Further, when any one of the coupling interval T2 and the pulse interval T1 according to the first embodiment satisfies the expression (1) or (2), the instability of the ink ejection after the micro-vibration is suppressed. Further, when both the coupling interval T2 and the pulse interval T1 satisfy the expression (1) or (2), it is particularly effective in suppressing the instability of the ink ejection after the micro-vibration.

3. MODIFICATION EXAMPLE

Each of the above-described embodiments can be variously modified. Specific modification aspects that can be applied to each of the above-described embodiments will be described below. Any two or more aspects selected from the following examples can be combined as appropriate as long as there is no contradiction.

3A. First Modification Example

Figure 26:
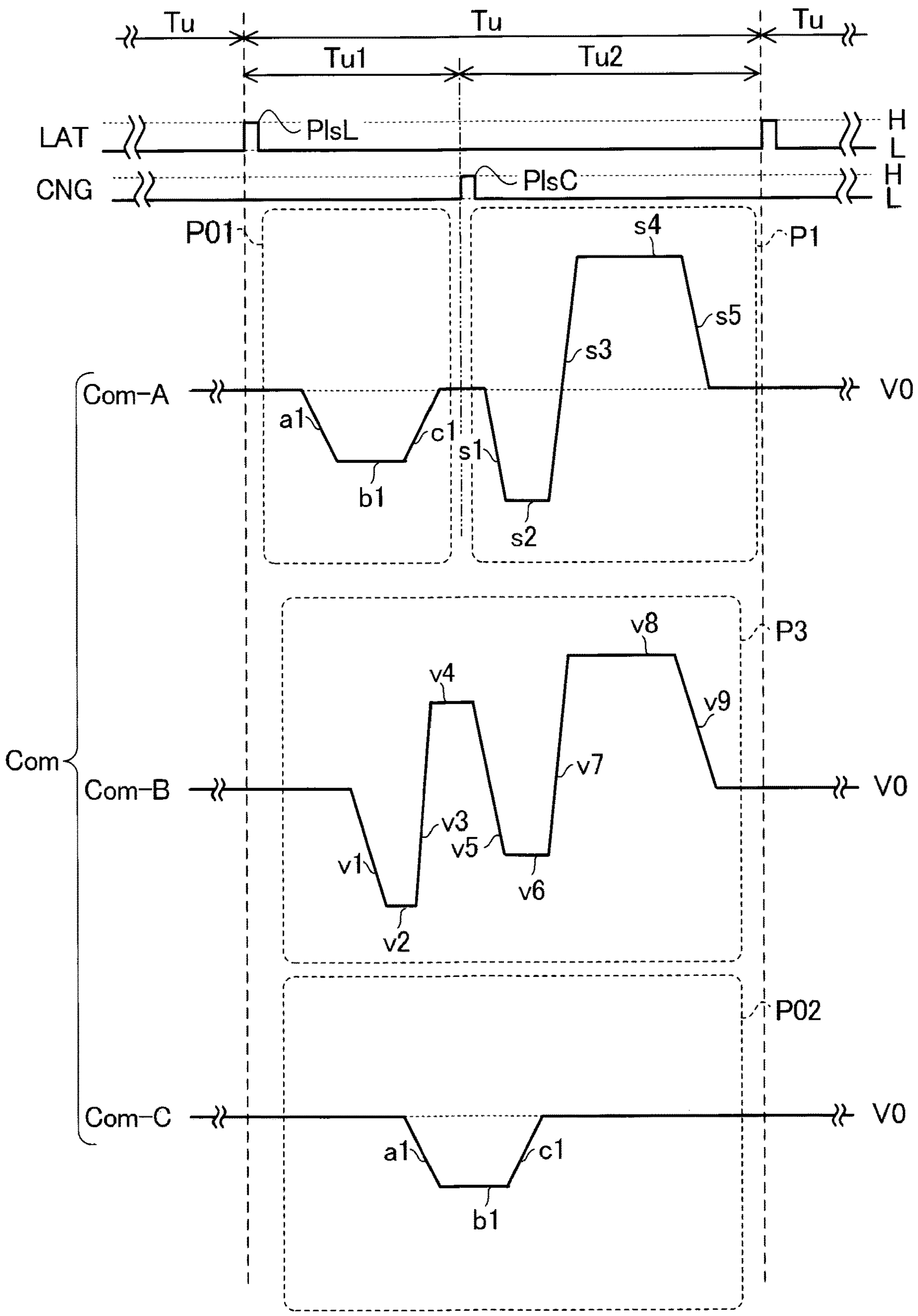
FIG. 26 is a diagram illustrating a drive signal in a first modification example.

FIG. 26 is a diagram illustrating the drive signal Com in a first modification example. As illustrated in FIG. 26, the change signal CNG includes a pulse PlsC for dividing the cycle Tu into a preceding control period Tu1 and a following control period Tu2. The control period Tu1 is, for example, a period from rising of the pulse PlsL to rising of the pulse PlsC. The control period Tu2 is, for example, a period from rising of the pulse PlsC to rising of the pulse PlsL.

In FIG. 26, the first drive signal Com-A includes the ejection pulse P1 and the non-ejection pulse P01. The ejection pulse P1 is provided in the control period Tu2. The non-ejection pulse P01 is provided in the control period Tu1. In the first modification example, one signal includes both the ejection pulse and the non-ejection pulse.

In FIG. 26, the second drive signal Com-B includes an ejection pulse P3. The ejection pulse P3 is a pulse of which a potential changes to cause the pressure generation unit 51*e* to generate the pressure fluctuation in the pressure chamber C such that the ink is ejected from the nozzle N. When the ejection pulse P3 is supplied to the pressure generation unit 51*e*, the ink is ejected from the nozzle N as ink droplets.

The ejection pulse P3 includes a second expansion drive element v1, a minimum potential v2, a contraction drive element v3, a high potential v4, an expansion drive element v5, a low potential v6, a contraction drive element v7, a maximum potential v8, and an expansion drive element v9 in this order. The minimum potential v2 is a minimum value of a voltage of the ejection pulse P3. The maximum potential v8 is a maximum value of the voltage of the ejection pulse P3. The high potential v4 is a potential that is higher than the reference potential and is lower than the maximum potential v8. The low potential v6 is a potential that is lower than the reference potential and is higher than the minimum potential v2. The second expansion drive element v1 is a falling edge from the reference potential toward the minimum potential v2. The second expansion drive element v1 is a drive element that drives the pressure generation unit 51*e* to expand the volume of the pressure chamber C. The contraction drive element v3 is a rising edge from the minimum potential v2 toward the high potential v4. The contraction drive element v3 is a drive element that drives the pressure generation unit 51*e* to contract the volume of the pressure chamber C. The expansion drive element v5 is a falling edge from the high potential v4 toward the low potential v6. The expansion drive element v5 is a drive element that drives the pressure generation unit 51*e* to expand the volume of the pressure chamber C. The contraction drive element v7 is a rising edge from the low potential v6 toward the maximum potential v8. The contraction drive element v7 is a drive element that drives the pressure generation unit 51*e* to contract the volume of the pressure chamber C. The expansion drive element v9 is a falling edge returning from the maximum potential v8 to the reference potential. The expansion drive element v9 is a drive element that drives the pressure generation unit 51*e* to expand the volume of the pressure chamber C.

In FIG. 26, the third drive signal Com-C includes the non-ejection pulse P02.

The drive signal generation section 24 repeatedly generates the drive signal Com including the plurality of pulses such as the ejection pulse P1, the ejection pulse P3, and the non-ejection pulses P01 and P02. The ejection pulse P1, the ejection pulse P3, and the non-ejection pulses P01 and P02 are appropriately selected and used as the supply signal Vin. Further, the drive signal Com illustrated in FIG. 26 may include a pulse other than the ejection pulse P1, the ejection pulse P3, and the non-ejection pulses P01 and P02. For example, the non-ejection pulses P03 and P04 described in each of the above-described embodiments may be included.

Figure 27:
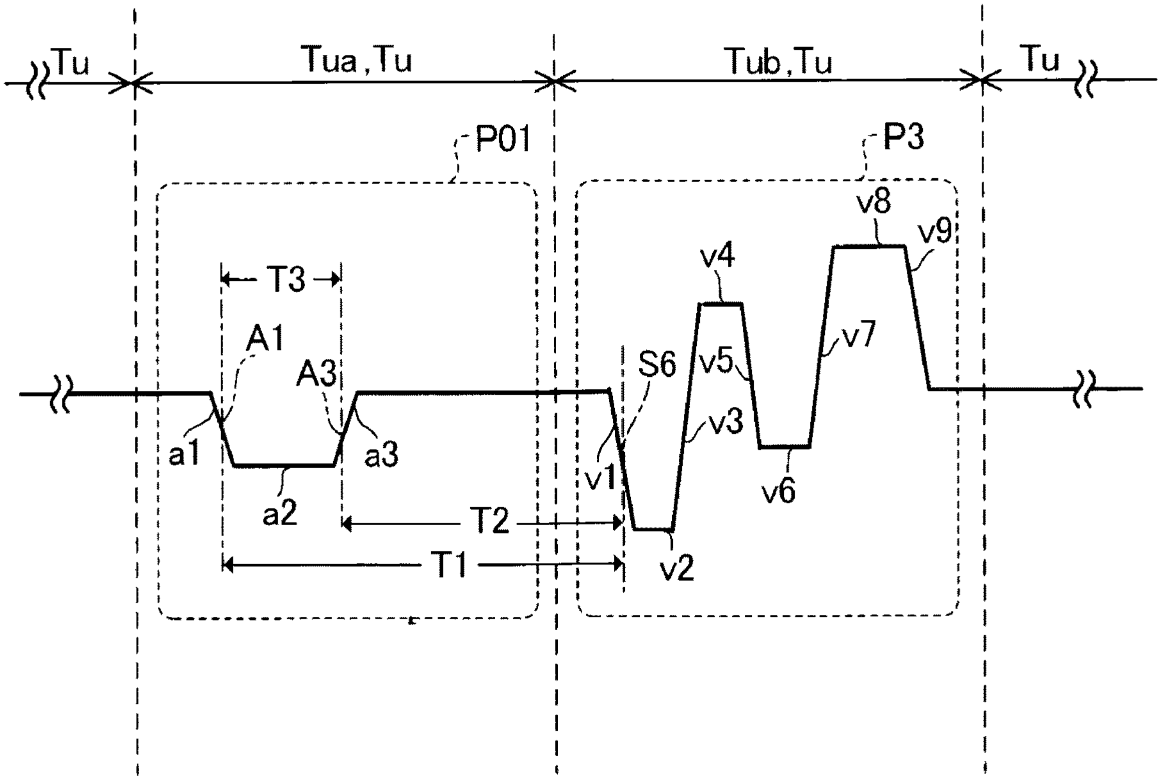
FIG. 27 is a diagram illustrating the pulse interval and coupling interval between the non-ejection pulse and the ejection pulse.
Figure 28:
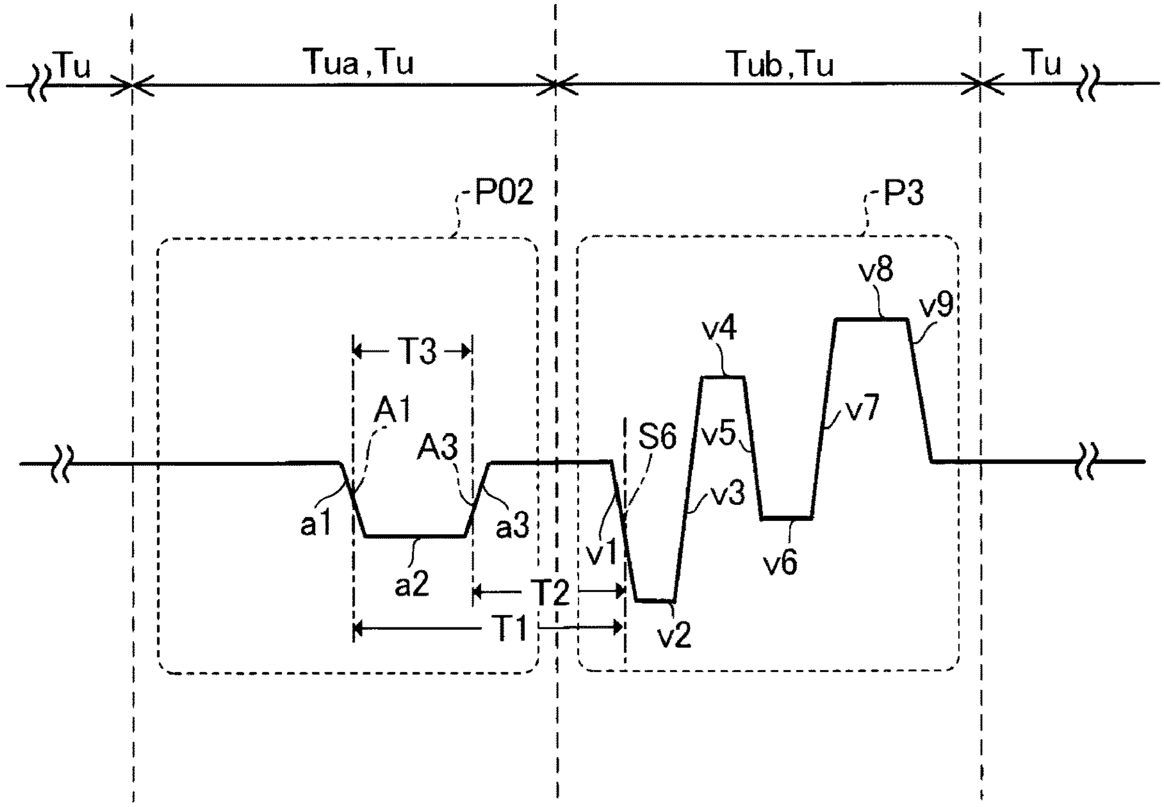
FIG. 28 is a diagram illustrating the pulse interval and coupling interval between the non-ejection pulse and the ejection pulse.

FIG. 27 is a diagram illustrating the pulse interval T1 and the coupling interval T2 between the non-ejection pulse P01 and the ejection pulse P3. FIG. 28 is a diagram illustrating the pulse interval T1 and the coupling interval T2 between the non-ejection pulse P02 and the ejection pulse P3. FIG. 27 illustrates an example in which the non-ejection pulse P01 is selected in the preceding cycle Tua, and the ejection pulse P3 is selected in the following cycle Tub. FIG. 28 illustrates an example in which the non-ejection pulse P02 is selected in the preceding cycle Tua, and the ejection pulse P3 is selected in the following cycle Tub.

Each of the non-ejection pulses P01 and P02 includes, at the beginning, the first expansion drive element a1 that drives the pressure generation unit 51*e* to expand the volume of the pressure chamber C. The ejection pulse P3 includes, at the beginning, the second expansion drive element v1 that drives the pressure generation unit 51*e* to expand the volume of the pressure chamber C. The first expansion drive element a1 and the second expansion drive element v1 are in the same phase.

The pulse interval T1 between the non-ejection pulse P01 or P02 of the preceding cycle Tua and the ejection pulse P3 of the following cycle Tub satisfies the expression (1). That is, when the first drive element of the non-ejection pulse is the first expansion drive element a1, and the first drive element of the ejection pulse is the second expansion drive element v1, the pulse interval T1 satisfies the expression (1). When the pulse interval T1 satisfies the expression (1), the instability of the ink ejection after the micro-vibration is suppressed compared to when the expression (1) is not satisfied. Therefore, the deterioration in the image quality can be suppressed.

In the examples illustrated in FIGS. 27 and 28, the pulse interval T1 is a time interval between the half-value point A1 of the period of the first expansion drive element a1 of the non-ejection pulse P01 or P02 and the half-value point S1 of a period of the second expansion drive element v1 of the ejection pulse P3. The half-value point Vi is a value that is increased by 50% from the minimum potential v2 in the second expansion drive element v1.

Further, each of the non-ejection pulses P01 and P02 includes, at the end, the first contraction drive element a3 that drives the pressure generation unit 51*e* to contract the volume of the pressure chamber C. The ejection pulse P3 includes, at the beginning, the second expansion drive element v1 that drives the pressure generation unit 51*e* to expand the volume of the pressure chamber C. The first contraction drive element a3 and the second expansion drive element v1 are in opposite phases.

The coupling interval T2 between the non-ejection pulse P01 or P02 of the preceding cycle Tua and the ejection pulse P3 of the following cycle Tub satisfies the expression (2). That is, when the last drive element of the non-ejection pulse is the first contraction drive element a3, and the first drive element of the ejection pulse is the second expansion drive element v1, the coupling interval T2 satisfies the expression (2).

When the coupling interval T2 satisfies the expression (2), the instability of the ink ejection after the micro-vibration is suppressed compared to when the expression (2) is not satisfied. In FIGS. 27 and 28, the coupling interval T2 is a time interval between the half-value point A2 of the period of the first contraction drive element a3 of the non-ejection pulse P01 or P02 and the half-value point Vi of the period of the second expansion drive element v1 of the ejection pulse P3.

In the first modification example, the example is described in which both the pulse interval T1 and the coupling interval T2 satisfy the expression (1) or (2). However, when any one of the pulse interval T1 and the coupling interval T2 satisfies the expression (1) or (2), it is possible to suppress the instability of the ink ejection after the micro-vibration.

In the first modification example, based on the change signal CNG illustrated in FIG. 26, as illustrated in FIGS. 8 and 9, the non-ejection pulse P01 or P02 may be selected in the preceding cycle Tua, and the ejection pulse P1 may be selected in the following cycle Tub.

3B. Second Modification Example

Figure 29:
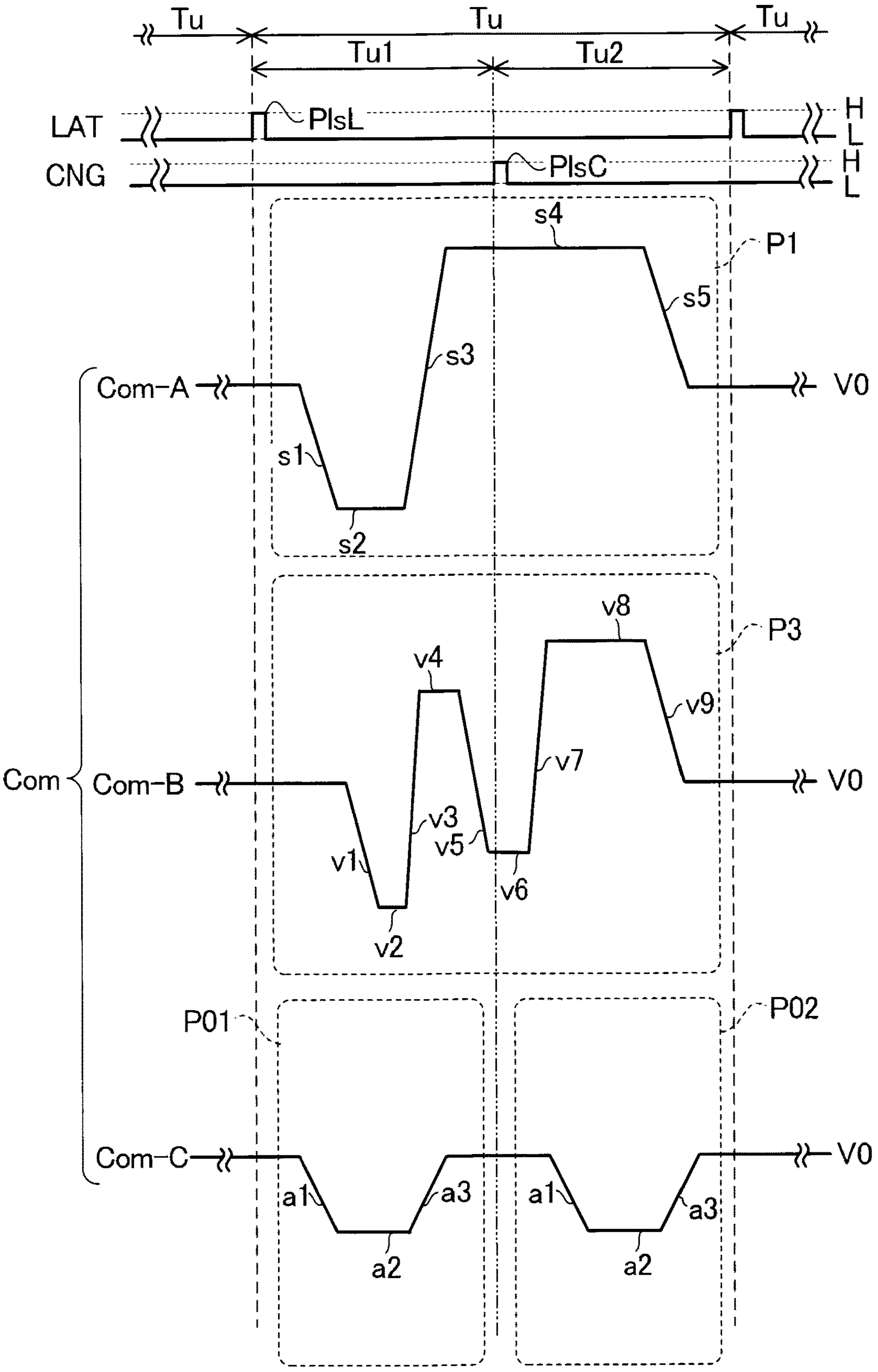
FIG. 29 is a diagram illustrating a drive signal in a second modification example.

FIG. 29 is a diagram illustrating the drive signal Com in a second modification example. In FIG. 29, the first drive signal Com-A includes the ejection pulse P1, and the second drive signal Com-B includes the ejection pulse P3. Further, in FIG. 29, the third drive signal Com-C includes the non-ejection pulses P01 and P2. The non-ejection pulse P01 is provided in the control period Tu1. The non-ejection pulse P02 is provided in the control period Tu2. In the second modification example, a plurality of non-ejection pulses are included in one signal.

In the present modification example, based on the change signal CNG, as illustrated in FIGS. 8 and 9, for example, the non-ejection pulse P01 or P02 may be selected in the preceding cycle Tua, and the ejection pulse P1 may be selected in the following cycle Tub. Further, as illustrated in FIGS. 27 and 28, for example, the non-ejection pulse P01 or P02 may be selected in the preceding cycle Tua, and the ejection pulse P3 may be selected in the following cycle Tub.

3C. Third Modification Example

Figure 30:
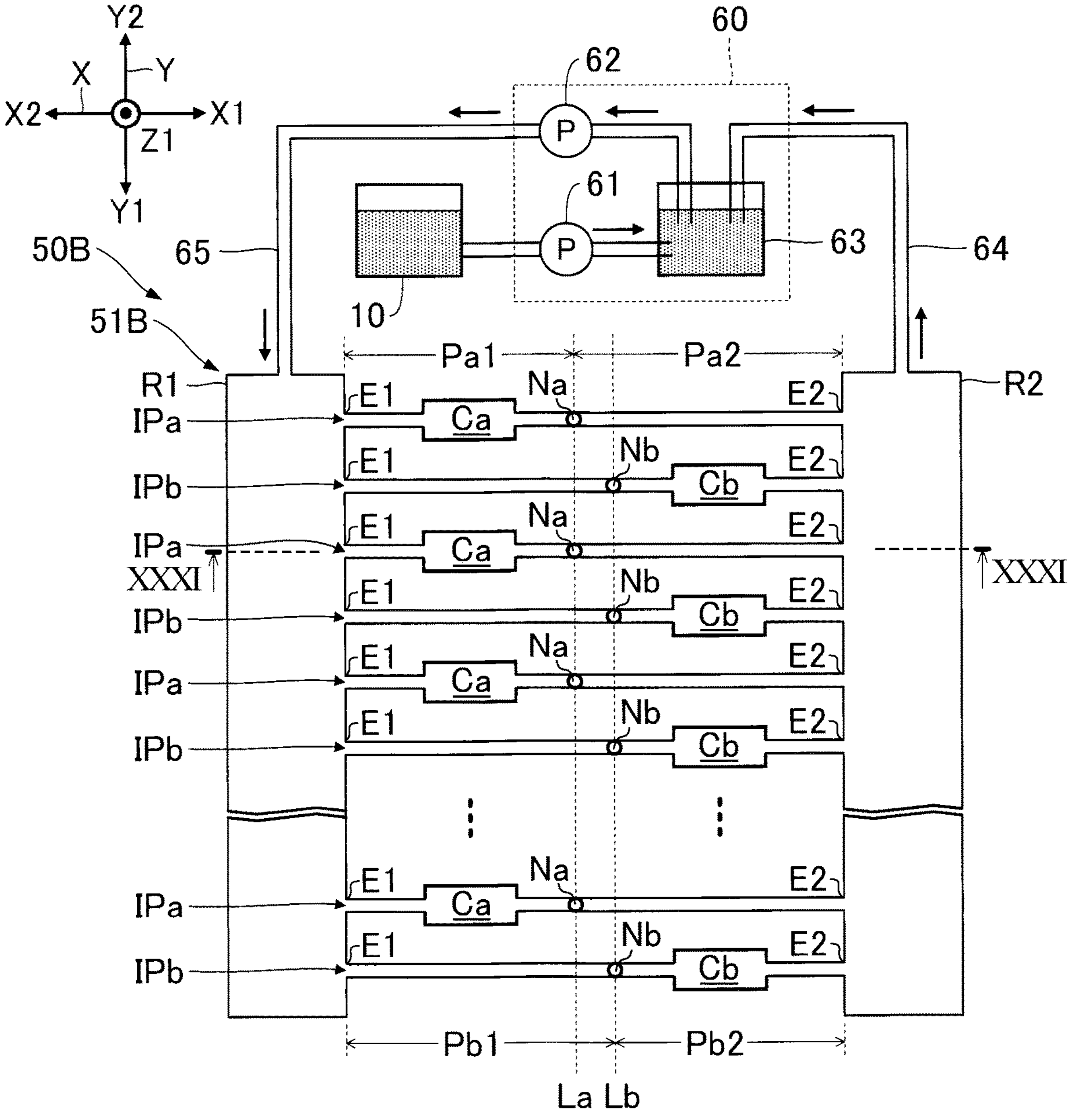
FIG. 30 is a schematic diagram illustrating a circulation flow channel of a liquid ejection head in a third modification example.

FIG. 30 is a schematic diagram illustrating a circulation flow channel of a liquid ejection head 50B in a third modification example. The liquid ejection head 50B is the same as the liquid ejection head 50 according to the first embodiment described above, except that the liquid ejection head 50B includes a plurality of individual flow channels IPa and a plurality of individual flow channels IPb instead of the plurality of individual flow channels IP. That is, as illustrated in FIG. 30, the liquid ejection head SOB is provided with the plurality of nozzles N, the plurality of individual flow channels IPa, the plurality of individual flow channels IPb, the first common liquid chamber R1, and the second common liquid chamber R2, and is coupled to the circulation mechanism 60.

Specifically, the liquid ejection head SOB is provided with a plurality of nozzles Na and a plurality of nozzles Nb. Each of these nozzles is configured in the same manner as in the nozzle N in the above-described embodiment and ejects the ink in the Z2 direction. Hereinafter, the nozzle Na and the nozzle Nb are collectively referred to as “nozzle N” when no distinction is necessary.

The plurality of nozzles Na are arranged along the Y axis, and this set constitutes a first nozzle array La. Similarly, the plurality of nozzles Nb are arranged along the Y axis, and this set constitutes a second nozzle array Lb.

The first nozzle array La and the second nozzle array Lb are arranged at a predetermined interval in the direction along the X axis. Here, an arrangement pitch of nozzle Na and an arrangement pitch of nozzle Nb are equal to each other, but the nozzle Na and the nozzle Nb, which are closest to each other, are disposed to be offset from each other in the direction along the Y axis.

Each of the plurality of nozzles Na communicates with the individual flow channel IPa. The plurality of respective individual flow channels IPa extend along the X axis and communicate with different nozzles Na. Similarly, each of the plurality of nozzles Nb communicates with the individual flow channel IPb. The plurality of respective individual flow channels IPb extend along the X axis and communicate with different nozzles Nb. The individual flow channel IPa and the individual flow channel IPb are alternately arranged along the Y axis.

The individual flow channel IPa is the same as the individual flow channel IP according to the above-described embodiment, except that the pressure chamber Cb is omitted. Specifically, the individual flow channel IPa includes a first flow channel portion Pa1 and a second flow channel portion Pa2. The first flow channel portion Pa1 in each individual flow channel IPa is a flow channel between the end portion E1 upstream of the individual flow channel IPa and the nozzle Na. The first flow channel portion Pa1 includes the pressure chamber Ca. On the other hand, the second flow channel portion Pa2 in each individual flow channel IPa is a flow channel between the end portion E2 downstream of the individual flow channel IPa and the nozzle Na.

The individual flow channel IPb is the same as the individual flow channel IP according to the above-described embodiment, except that the pressure chamber Ca is omitted. Specifically, the individual flow channel IPb includes a third flow channel portion Pb1 and a fourth flow channel portion Pb2. The third flow channel portion Pb1 in each individual flow channel IPb is a flow channel between the end portion E1 upstream of the individual flow channel IPb and the nozzle Nb. On the other hand, the fourth flow channel portion Pb2 in each individual flow channel IPb is a flow channel between the end portion E2 downstream of the individual flow channel IPb and the nozzle Nb. The fourth flow channel portion Pb2 includes the pressure chamber Cb.

The first common liquid chamber R1 is coupled to the end portion E1 upstream of each individual flow channel IPa and each individual flow channel IPb. On the other hand, the second common liquid chamber R2 is coupled to the end portion E2 downstream of each individual flow channel IPa and each individual flow channel IPb.

Figure 31:
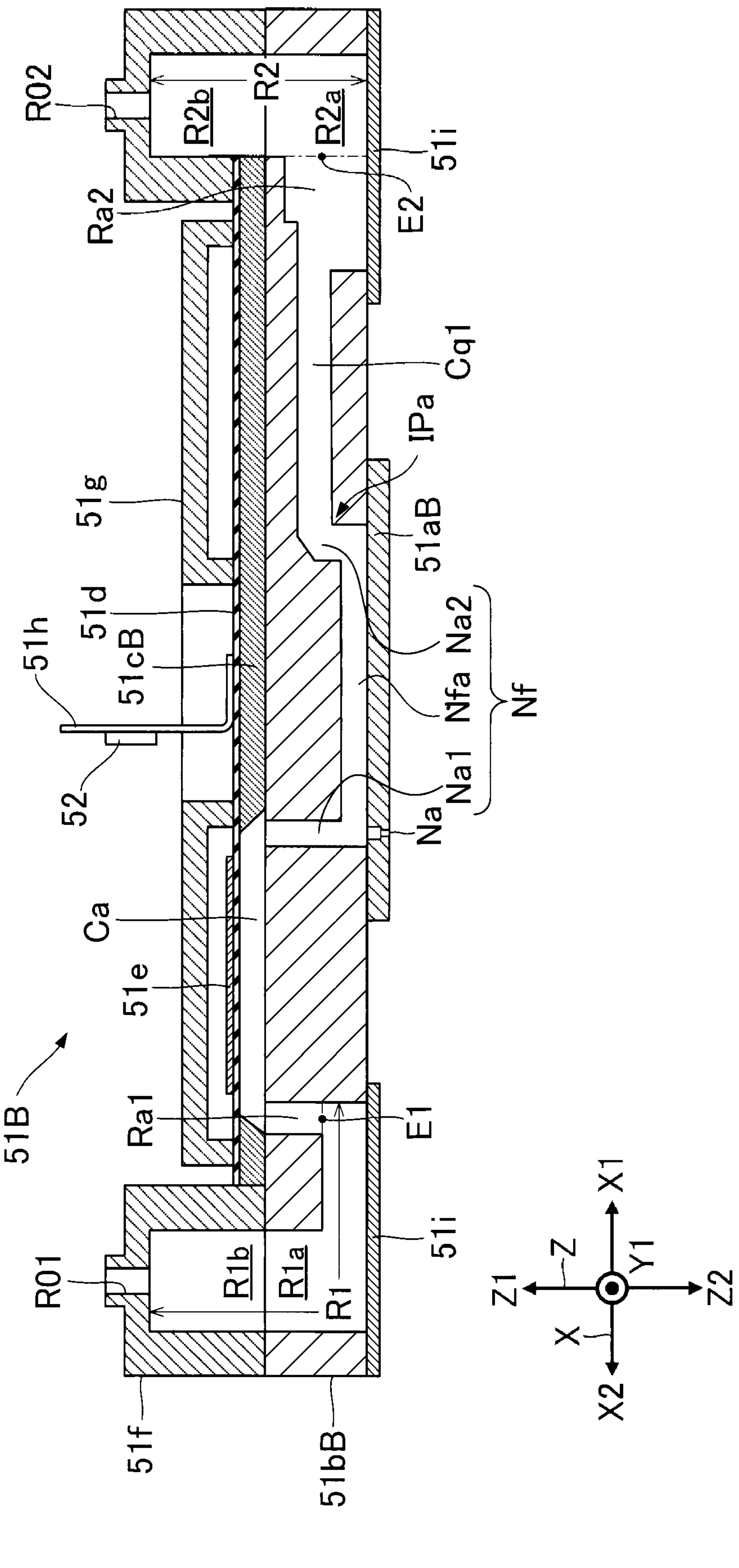
FIG. 31 is a cross-sectional view taken along line XXXI-XXXI in FIG. 30.

FIG. 31 is a cross-sectional view taken along line XXXI-XXXI in FIG. 30. In FIG. 31, a cross section of the liquid ejection head 50B, which is cut along a plane parallel to the X axis and the Z axis along the individual flow channel IPa, is illustrated. Hereinafter, the configuration of the individual flow channel IPa will be described as a representative example. The individual flow channel IPb is the same as the individual flow channel IPa, except that the individual flow channel IPb is oriented 1800 differently around the Z axis, so the description thereof will be omitted.

The individual flow channel IPa is the same as the individual flow channel IP according to the first embodiment, except that the pressure chamber Cb is replaced with a lateral communication flow channel Cq1. The liquid ejection head 50B is configured in the same manner as in the liquid ejection head 50 of the first embodiment except that the liquid ejection head 50B includes a nozzle substrate 51*a*B, a flow channel substrate 51*b*B, and a pressure chamber substrate 51*c*B instead of the nozzle substrate 51*a*, the flow channel substrate 51*b*, and the pressure chamber substrate 51*c*. In the individual flow channel IPa, the pressure generation unit 51*e* corresponding to the pressure chamber Cb is omitted.

The nozzle substrate 51*a*B is provided with the plurality of nozzles Na. Here, the nozzle substrate 51*a*B is configured in the same manner as in the nozzle substrate 51*a*, except for a difference in the disposition of the nozzles Na. Here, when seen in the direction along the Z axis, the nozzle Na overlaps with the pressure chamber Ca.

The flow channel substrate 51*b*B is provided with a portion excluding the pressure chamber Ca in the individual flow channel IPa, the liquid chamber R1*a*, and the liquid chamber R2*a*.

As illustrated in FIG. 31, each individual flow channel IPa includes the communication flow channel Nf, the lateral communication flow channel Cq1, the individual supply flow channel Ra1, and the individual discharge flow channel Ra2, in addition to the pressure chamber Ca. Among these, the communication flow channel Nf, the lateral communication flow channel Cq1, the individual supply flow channel Ra1, and the individual discharge flow channel Ra2 are provided in the flow channel substrate 51*b*B. Here, the first communication flow channel Na1 of the communication flow channel Nf overlaps with the nozzle Na when seen in the direction along the Z axis. Further, the nozzle Na branches off from the first communication flow channel Na1 in a direction different from the nozzle flow channel Nfa.

The lateral communication flow channel Cq1 is a space extending along the X axis. Through the lateral communication flow channel Cq1, the second communication flow channel Na2 and the individual discharge flow channel Ra2 communicate with each other, and the ink is guided from the second communication flow channel Na2 to the individual discharge flow channel Ra2.

The pressure chamber substrate 51*c*B is the same as the pressure chamber substrate 51*c* according to the above-described embodiment, except that the pressure chamber Cb is omitted for the individual flow channel IPa.

3D. Other Modification Examples

Each of the embodiments and modification examples described above include the circulation mechanism, but it is not necessary to include the circulation mechanism. However, since the circulation mechanism is provided, even when the micro-vibration of the meniscus MN is increased so that the ink circulating through the circulation flow channel and the ink in the nozzle N can be efficiently replaced, it is possible to ensure the stability of the ejection of the ink droplets immediately after the micro-vibration.

In each of the above-described embodiments, two types of the ejection pulses P1 and P2 or the ejection pulses P1 and P3 are described, but the ejection pulses are not limited to these and may be pulses having other shapes. Similarly, in each of the above-described embodiments, four types of the non-ejection pulses P01, P02, P03, and P04 are described, but the non-ejection pulses are not limited to these and may be pulses having other shapes. Further, in each of the above-described embodiments, four types of the non-ejection pulses P01, P02, P03, and P04 are described, but the non-ejection pulses can be at least one.

In each of the above-described embodiments, the configuration is described in which the nozzle N includes first portion NP1 and a second portion NP2, but the nozzle N is not limited to this configuration. For example, the nozzle N may have a constant width or may have a shape with three or more steps.

The pressure generation unit that generates the pressure fluctuation in the ink in the pressure chamber C is not limited to the pressure generation unit 51*e* described in each of the above-described embodiments. For example, a heating element that generates bubbles in the pressure chamber C through heating to generate the ink pressure fluctuation may be used as the pressure generation unit.

In each of the above-described embodiments, a serial-type liquid ejection apparatus 100, which reciprocates the carriage 41 equipped with the liquid ejection head 50, is described, but the present disclosure is also applicable to a line-type liquid ejection apparatus in which the plurality of nozzles N are distributed over the entire width of the medium M.

The liquid ejection apparatus 100 described in the above-described embodiments may be adopted in various apparatuses such as a facsimile machine and a copier, in addition to an apparatus dedicated to printing, and the application of the present disclosure is not particularly limited. However, the application of the liquid ejection apparatus is not limited to printing. For example, a liquid ejection apparatus that ejects a solution of a coloring material is used as a manufacturing apparatus that forms a color filter of a display device such as a liquid crystal display panel. In addition, a liquid ejection apparatus that ejects a solution of a conductive material is used as a manufacturing apparatus that forms a wiring or an electrode on a wiring substrate. In addition, a liquid ejection apparatus that ejects a solution of an organic substance related to a living body is used, for example, as a manufacturing apparatus that manufactures a biochip.

Although the present disclosure is described based on the preferred embodiments, the present disclosure is not limited to the above-described embodiments. The configuration of each section of the present disclosure can be replaced with any configuration that has the same function in the above-described embodiments, and any configuration can be added.

What is claimed is:

1. A liquid ejection apparatus comprising:

an ejection section including a nozzle, a pressure chamber communicating with the nozzle, and a pressure generation unit that is configured to generate a pressure fluctuation in liquid in the pressure chamber;

a drive signal generation section that is configured to repeatedly generate a drive signal including a plurality of pulses including an ejection pulse and a non-ejection pulse; and a drive control section that is configured to supply a pulse selected from the ejection pulse and the non-ejection pulse included in the drive signal to the pressure generation unit for each of repetitive cycles, wherein the ejection pulse is a pulse of which a potential changes to cause the pressure generation unit to generate the pressure fluctuation such that the liquid is ejected from the nozzle, the non-ejection pulse is a pulse of which a potential changes to cause the pressure generation unit to generate the pressure fluctuation such that the liquid is not ejected from the nozzle, and when the non-ejection pulse is selected in a preceding cycle of two consecutive cycles among the repetitive cycles, and the ejection pulse is selected in a following cycle of the two consecutive cycles, a pulse interval T1 between the non-ejection pulse of the preceding cycle and the ejection pulse of the following cycle satisfies any one of following expressions (1) and (2):

$$1.7 \times Tc \times n \leq T1 \leq 1.9 \times Tc \times n \quad (1)$$

$$1.2 \times Tc \times n \leq T1 \leq 1.4 \times Tc \times n \quad (2)$$

where Tc is a natural vibration cycle of the ejection section, and n is a natural number.

2. The liquid ejection apparatus according to claim 1, wherein the non-ejection pulse includes, at beginning, a first expansion drive element that drives the pressure generation unit to expand a volume of the pressure chamber, the ejection pulse includes, at beginning, a second expansion drive element that drives the pressure generation unit to expand the volume of the pressure chamber, the pulse interval T1 is a time interval between a half-value point of a period of the first expansion drive element and a half-value point of a period of the second expansion drive element, and the pulse interval T1 satisfies the expression (1).

3. The liquid ejection apparatus according to claim 1, wherein the non-ejection pulse includes, at beginning, a first expansion drive element that drives the pressure generation unit to expand a volume of the pressure chamber, the ejection pulse includes, at beginning, a preparatory contraction drive element that drives the pressure generation unit to contract the volume of the pressure chamber, the pulse interval T1 is a time interval between a half-value point of a period of the first expansion drive element and a half-value point of a period of the preparatory contraction drive element, and the pulse interval T1 satisfies the expression (2).

4. The liquid ejection apparatus according to claim 1, wherein the non-ejection pulse includes, at beginning, a first contraction drive element that drives the pressure generation unit to contract a volume of the pressure chamber, the ejection pulse includes, at beginning, a second expansion drive element that drives the pressure generation unit to expand the volume of the pressure chamber, the pulse interval T1 is a time interval between a half-value point of a period of the first contraction drive element and a half-value point of a period of the second expansion drive element, and the pulse interval T1 satisfies the expression (2).

5. The liquid ejection apparatus according to claim 1, wherein the non-ejection pulse includes, at beginning, a first contraction drive element that drives the pressure generation unit to contract a volume of the pressure chamber, the ejection pulse includes, at beginning, a preparatory contraction drive element that drives the pressure generation unit to contract the volume of the pressure chamber, the pulse interval T1 is a time interval between a half-value point of a period of the first contraction drive element and a half-value point of a period of the preparatory contraction drive element, and the pulse interval T1 satisfies the expression (1).

6. The liquid ejection apparatus according to claim 1, wherein the n is 1.

7. The liquid ejection apparatus according to claim 1, wherein a pulse width T3 of the non-ejection pulse is 0.5 Tc.

8. A liquid ejection apparatus comprising:

an ejection section including a nozzle, a pressure chamber communicating with the nozzle, and a pressure generation unit that is configured to generate a pressure fluctuation in liquid in the pressure chamber;

a drive signal generation section that is configured to repeatedly generate a drive signal including a plurality of pulses including an ejection pulse and a non-ejection pulse; and a drive control section that is configured to supply a pulse selected from the ejection pulse and the non-ejection pulse included in the drive signal to the pressure generation unit for each of repetitive cycles, wherein the ejection pulse is a pulse of which a potential changes to cause the pressure generation unit to generate the pressure fluctuation such that the liquid is ejected from the nozzle, the non-ejection pulse is a pulse of which a potential changes to cause the pressure generation unit to generate the pressure fluctuation such that the liquid is not ejected from the nozzle, and when the non-ejection pulse is selected in a preceding cycle of two consecutive cycles among the repetitive cycles, and the ejection pulse is selected in a following cycle of the two consecutive cycles, a coupling interval T2 between the non-ejection pulse of the preceding cycle and the ejection pulse of the following cycle satisfies any one of following expressions (1) and (2):

$$1.7\times Tc\times n \leq T2 \leq 1.9\times Tc\times n \quad (1)$$

$$1.2\times Tc\times n \leq T2 \leq 1.4\times Tc\times n \quad (2)$$

where Tc is a natural vibration cycle of the ejection section, and n is a natural number.

9. The liquid ejection apparatus according to claim 8, wherein the non-ejection pulse includes, at end, a first contraction drive element that drives the pressure generation unit to contract a volume of the pressure chamber, the ejection pulse includes, at beginning, a second expansion drive element that drives the pressure generation unit to expand the volume of the pressure chamber, the coupling interval T2 is a time interval between a half-value point of a period of the first contraction drive element and a half-value point of a period of the second expansion drive element, and the coupling interval T2 satisfies the expression (2).

10. The liquid ejection apparatus according to claim 8, wherein the non-ejection pulse includes, at end, a first contraction drive element that drives the pressure generation unit to contract a volume of the pressure chamber, the ejection pulse includes, at beginning, a preparatory contraction drive element that drives the pressure generation unit to contract the volume of the pressure chamber, the coupling interval T2 is a time interval between a half-value point of a period of the first contraction drive element and a half-value point of a period of the preparatory contraction drive element, and the coupling interval T2 satisfies the expression (1).

11. The liquid ejection apparatus according to claim 8, wherein the non-ejection pulse includes, at end, a first expansion drive element that drives the pressure generation unit to expand a volume of the pressure chamber, the ejection pulse includes, at beginning, a second expansion drive element that drives the pressure generation unit to expand the volume of the pressure chamber, the coupling interval T2 is a time interval between a half-value point of a period of the first expansion drive element and a half-value point of a period of the second expansion drive element, and the coupling interval T2 satisfies the expression (1).

12. The liquid ejection apparatus according to claim 8, wherein the non-ejection pulse includes, at end, a first expansion drive element that drives the pressure generation unit to expand a volume of the pressure chamber, the ejection pulse includes, at beginning, a preparatory contraction drive element that drives the pressure generation unit to contract the volume of the pressure chamber, the coupling interval T2 is a time interval between a half-value point of a period of the first expansion drive element and a half-value point of a period of the preparatory contraction drive element, and the coupling interval T2 satisfies the expression (2).

13. The liquid ejection apparatus according to claim 8, wherein the n is 1.

14. The liquid ejection apparatus according to claim 8, wherein a pulse width T3 of the non-ejection pulse is 0.5 Tc.

15. A liquid ejection method of a liquid ejection apparatus configured to eject liquid, wherein the liquid ejection apparatus includes an ejection section including a nozzle, a pressure chamber communicating with the nozzle, and a pressure generation unit that is configured to generate a pressure fluctuation in liquid in the pressure chamber, a drive signal generation section that is configured to repeatedly generate a drive signal including a plurality of pulses including an ejection pulse and a non-ejection pulse, and a drive control section that is configured to supply a pulse selected from the ejection pulse and the non-ejection pulse included in the drive signal to the pressure generation unit for each of repetitive cycles, the ejection pulse is a pulse of which a potential changes to cause the pressure generation unit to generate the pressure fluctuation such that the liquid is ejected from the nozzle, the non-ejection pulse is a pulse of which a potential changes to cause the pressure generation unit to generate the pressure fluctuation such that the liquid is not ejected from the nozzle, and when the non-ejection pulse is selected in a preceding cycle of two consecutive cycles among the repetitive cycles, and the ejection pulse is selected in a following cycle of the two consecutive cycles, a pulse interval T1 between the non-ejection pulse of the preceding cycle and the ejection pulse of the following cycle satisfies any one of following expressions (1) and (2):

$$1.7\times Tc\times n \leq T1 \leq 1.9\times Tc\times n \quad (1)$$

$$1.2\times Tc\times n \leq T1 \leq 1.4\times Tc\times n \quad (2)$$

where Tc is a natural vibration cycle of the ejection section, and n is a natural number.

16. A liquid ejection method of a liquid ejection apparatus configured to eject liquid, wherein the liquid ejection apparatus includes an ejection section including a nozzle, a pressure chamber communicating with the nozzle, and a pressure generation unit that is configured to generate a pressure fluctuation in liquid in the pressure chamber, a drive signal generation section that is configured to repeatedly generate a drive signal including a plurality of pulses including an ejection pulse and a non-ejection pulse, and a drive control section that is configured to supply a pulse selected from the ejection pulse and the non-ejection pulse included in the drive signal to the pressure generation unit for each of repetitive cycles, the ejection pulse is a pulse of which a potential changes to cause the pressure generation unit to generate the pressure fluctuation such that the liquid is ejected from the nozzle, the non-ejection pulse is a pulse of which a potential changes to cause the pressure generation unit to generate the pressure fluctuation such that the liquid is not ejected from the nozzle, and when the non-ejection pulse is selected in a preceding cycle of two consecutive cycles among the repetitive cycles, and the ejection pulse is selected in a following cycle of the two consecutive cycles, a coupling interval T2 between the non-ejection pulse of the preceding cycle and the ejection pulse of the following cycle satisfies any one of following expressions (1) and (2)

$$1.7\times Tc\times n\leq T2\leq 1.9\times Tc\times n \quad (1)$$

$$1.2\times Tc\times n\leq T2\leq 1.4\times Tc\times n \quad (2)$$

where Tc is a natural vibration cycle of the ejection section, and n is a natural number.

* * * * *